(12) United States Patent
Lee et al.

(10) Patent No.: US 12,309,420 B2
(45) Date of Patent: *May 20, 2025

(54) METHOD AND DEVICE FOR IMAGE DECODING ACCORDING TO INTER-PREDICTION IN IMAGE CODING SYSTEM

(71) Applicant: BEIJING XIAOMI MOBILE SOFTWARE CO., LTD., Beijing (CN)

(72) Inventors: Jaeho Lee, Seoul (KR); Seunghwan Kim, Seoul (KR)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,727

(22) Filed: May 23, 2024

(65) Prior Publication Data

US 2024/0314351 A1 Sep. 19, 2024

Related U.S. Application Data

(63) Continuation of application No. 18/128,757, filed on Mar. 30, 2023, now Pat. No. 12,022,109, which is a
(Continued)

(51) Int. Cl.
| | | |
|---|---|---|
| *H04N 19/52* | (2014.01) | |
| *H04N 19/105* | (2014.01) | |
| *H04N 19/107* | (2014.01) | |
| *H04N 19/119* | (2014.01) | |
| *H04N 19/132* | (2014.01) | |
| *H04N 19/137* | (2014.01) | |
| *H04N 19/139* | (2014.01) | |
| *H04N 19/159* | (2014.01) | |
| *H04N 19/176* | (2014.01) | |

(Continued)

(52) U.S. Cl.
CPC .......... *H04N 19/52* (2014.11); *H04N 19/132* (2014.11); *H04N 19/139* (2014.11); *H04N 19/577* (2014.11)

(58) Field of Classification Search
None
See application file for complete search history.

(56) References Cited

U.S. PATENT DOCUMENTS

| | | | | |
|---|---|---|---|---|
| 2016/0191931 A1* | 6/2016 | Hannuksela | ......... | H04N 19/136 375/240.12 |
| 2018/0241998 A1* | 8/2018 | Chen | .................... | H04N 19/109 |

(Continued)

*Primary Examiner* — Hung Q Dang
(74) *Attorney, Agent, or Firm* — Cozen O'Connor

(57) ABSTRACT

An image decoding method performed by a decoding device according to the present disclosure comprises: a step of deriving reference picture list 0 (L0) and reference picture list 1 (L1); a step of deriving two motion vectors (MV) for a current block, the two MVs including MVL0 for the L0 and MVL1 for the L1; a step of determining whether to apply bi-prediction optical flow (BIO) prediction for deriving refined motion vectors by sub-blocks to the current block; a step of deriving a refined motion vector for a sub-block of the current block based on the MVL0 and MVL1, if the BIO prediction is applied to the current block; and a step of deriving a prediction sample based on the refined motion vector.

3 Claims, 15 Drawing Sheets

Related U.S. Application Data continuation of application No. 16/772,645, filed as application No. PCT/KR2018/015818 on Dec. 13, 2018, now Pat. No. 11,647,221.

(60) Provisional application No. 62/598,992, filed on Dec. 14, 2017.

(51) Int. Cl.
*H04N 19/463* (2014.01)
*H04N 19/513* (2014.01)
*H04N 19/577* (2014.01)
*H04N 19/91* (2014.01)

(56) References Cited

U.S. PATENT DOCUMENTS

| | | | | |
|---|---|---|---|---|
| 2018/0249172 A1* | 8/2018 | Chen | ................... | H04N 19/521 |
| 2019/0082192 A1* | 3/2019 | Chuang | ................ | H04N 19/577 |

\* cited by examiner (a) Existing BIO      (b) Block based BIO

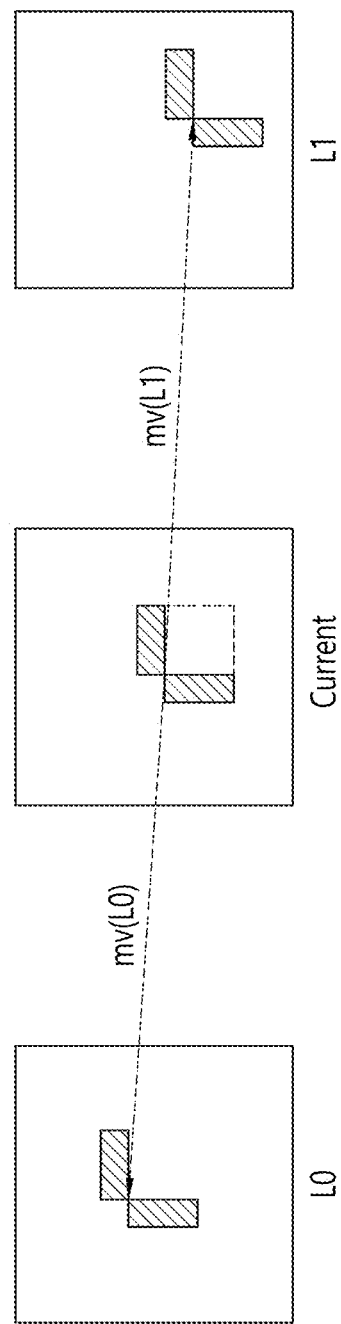

METHOD AND DEVICE FOR IMAGE DECODING ACCORDING TO INTER-PREDICTION IN IMAGE CODING SYSTEM

CROSS-REFERENCE TO RELATED APPLICATIONS

This application is a continuation of U.S. application Ser. No. 18/128,757, filed on Mar. 30, 2023, which is a continuation of U.S. application Ser. No. 16/772,645, filed on Jun. 12, 2020, now U.S. Pat. No. 11,647,221, which is a National Stage application under 35 U.S.C. § 371 of International Application No. PCT/KR2018/015818, filed on Dec. 13, 2018, which claims the benefit of U.S. Provisional Application No. 62/598,992, filed on Dec. 14, 2017. The disclosures of the prior applications are incorporated by reference herein in their entirety.

BACKGROUND OF THE DISCLOSURE

Field of the Disclosure

The present disclosure relates to an image coding technology, and more particularly, to an image decoding method according to inter-prediction in an image coding system and a device therefor.

Related Art

Demand for high-resolution, high-quality images such High Definition (HD) images and Ultra High Definition (UHD) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

A technical problem to be addressed by the present disclosure lies in providing a method and a device which increase image coding efficiency.

A technical problem to be addressed by the present disclosure lies in providing a method and a device which increase inter-prediction efficiency.

Another technical problem to be addressed by the present disclosure lies in providing a method and a device which derive a refined motion vector of a sub-block unit by applying BIO prediction.

Still another technical problem to be addressed by the present disclosure lies in providing a method and a device which decrease computational complexity of the calculation of deriving a refined motion vector by determining whether BIO prediction is applied.

According to an example of the present disclosure, there is provided an image decoding method which is performed by a decoding device. The method includes deriving a reference picture list 0 (L0) and a reference picture list 1 (L1), deriving two motion vectors (MVs) for a current block, wherein the two MVs include an MVL0 for the L0, and an MVL1 for the L1, determining whether bi-predictional optical-flow (BIO) prediction deriving a refined motion vector on a sub-block basis is applied to the current block, deriving the refined motion vector for a sub-block of the current block based on the MVL0 and the MVL1 when the BIO prediction is applied to the current block, and deriving a prediction sample based on the refined motion vector.

According to another example of the present disclosure, there is provided a decoding device performing image decoding. The decoding device includes an entropy decoder configured to obtain information on inter-prediction of a current block through a bitstream, and a predictor configured to derive a reference picture list 0 (L0) and a reference picture list 1 (L1), derive two motion vectors (MVs) for the current block, wherein the two MVs include an MVL0 for the L0, and an MVL1 for the L1, determine whether bi-predictional optical-flow (BIO) prediction deriving a refined motion vector on a sub-block basis is applied to the current block, derive the refined motion vector for a sub-block of the current block based on the MVL0 and the MVL1 when the BIO prediction is applied to the current block, and derive a prediction sample based on the refined motion vector.

According to still another example of the present disclosure, there is provided a video encoding method which is performed by an encoding device. The method includes deriving a reference picture list 0 (L0) and a reference picture list 1 (L1), deriving two motion vectors (MVs) for a current block, wherein the two MVs include an MVL0 for the L0, and an MVL1 for the L1, determining whether bi-predictional optical-flow (BIO) prediction deriving a refined motion vector on a sub-block basis is applied to the current block, deriving the refined motion vector for a sub-block of the current block based on the MVL0 and the MVL1 when the BIO prediction is applied to the current block, deriving a prediction sample based on the refined motion vector, and entropy encoding information on inter-prediction of the current block.

According to still another example of the present disclosure, there is provided a video encoding device. The encoding device includes a predictor configured to derive a reference picture list 0 (L0) and a reference picture list 1 (L1), derive two motion vectors (MVs) for the current block, wherein the two MVs include an MVL0 for the L0, and an MVL1 for the L1, determine whether bi-predictional optical-flow (BIO) prediction deriving a refined motion vector on a sub-block basis is applied to the current block, derive the refined motion vector for a sub-block of the current block based on the MVL0 and the MVL1 when the BIO prediction is applied to the current block, and derive a prediction sample based on the refined motion vector, and an entropy encoder configured to entropy encode information on inter-prediction of the current block.

According to the present disclosure, it is possible to reduce the computational complexity of the inter-prediction which uses the refined motion vector derived on a sub-block basis by determining whether the BIO prediction is applied to the current block, through which it is possible to improve the overall coding efficiency.

According to the present disclosure, it is possible to reduce the computational complexity of the inter-prediction which uses the refined motion vector derived on a sub-block basis by determining based on the mode of FRUC whether the BIO prediction is applied, through which it is possible to improve the overall coding efficiency.

BRIEF DESCRIPTION OF THE DRAWINGS

FIG. 7 illustratively represents an example of deriving a motion information through the TM method.

DESCRIPTION OF EXEMPLARY EMBODIMENTS

Figure 1:
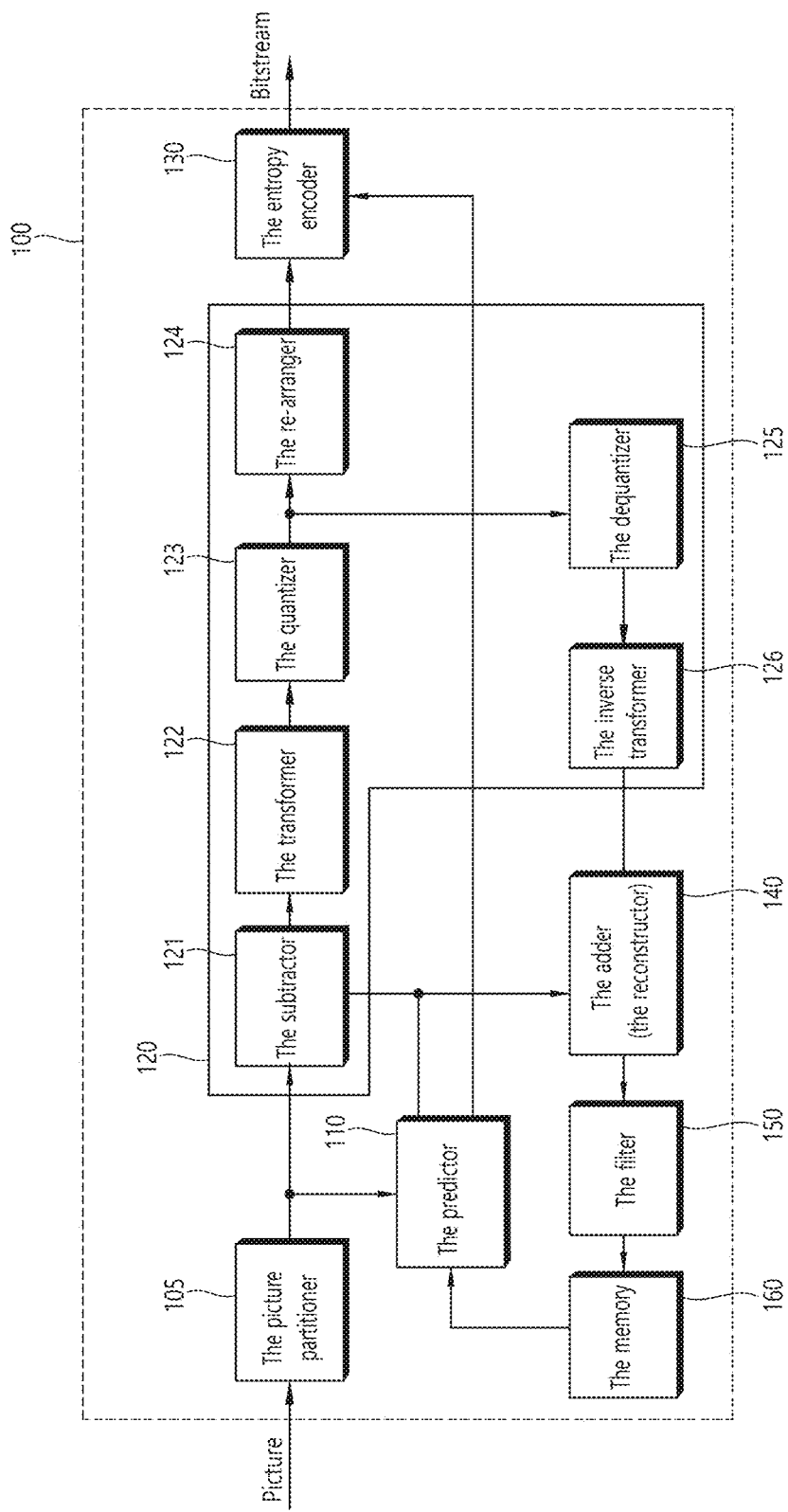
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method(s)/embodiment(s) disclosed in the present disclosure may be applied to a method disclosed in a versatile video coding (VVC) standard or a next generation video/image coding standard.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding device to which the present disclosure is applicable.

Referring to FIG. 1, a video encoding device (100) may include a picture partitioner (105), a predictor (110), a residual processor (120), an entropy encoder (130), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor (121) generates a residual sample which is a difference between an original sample and a prediction sample. If the skip mode is applied, the residual sample may not be generated as described above.

The transformer (122) transforms residual samples in units of a transform block to generate a transform coefficient. The transformer (122) may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction in addition to the quantized transform coefficients. The entropy encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a prediction sample to reconstruct a picture. The residual sample may be added to the prediction sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
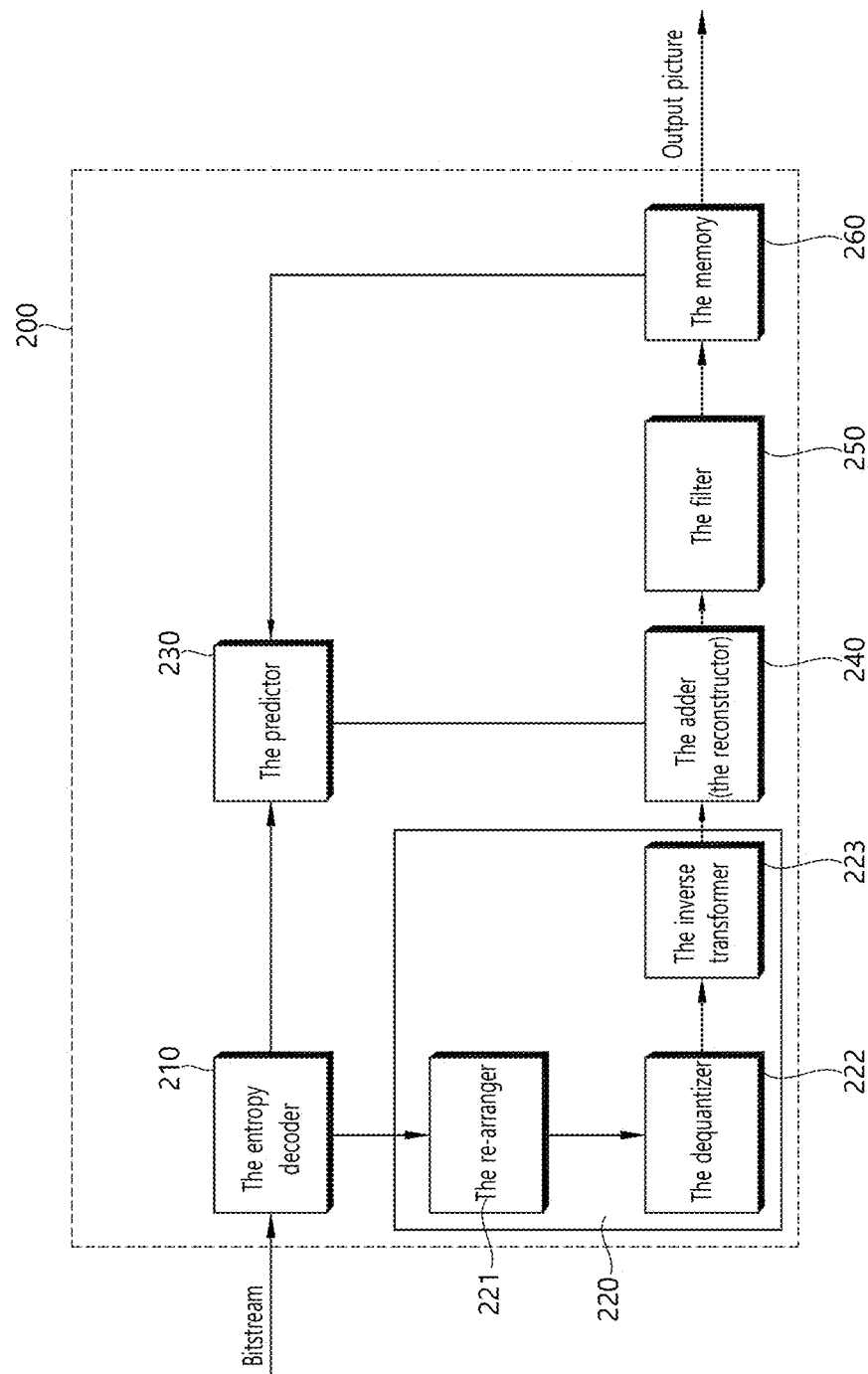
FIG. 2 is a schematic diagram illustrating a configuration of a video decoding device to which the present disclosure is applicable.

FIG. 2 is a schematic diagram illustrating a configuration of a video decoding device to which the present disclosure is applicable.

Referring to FIG. 2, a video decoding device (200) may include an entropy decoder (210), a residual processor (220), a predictor (230), an adder (240), a filter (250), and a memory (260). The residual processor (220) may include a re-arranger (221), a dequantizer (222), an inverse transformer (223).

When a bitstream including video information is input, the video decoding device (200) may reconstruct a video in relation to a process by which video information is processed in the video encoding device.

For example, the video decoding device (200) may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information on prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding device. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding device.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding device, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor (230) may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor (230) may obtain a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder (240) can add a residual sample to a prediction sample to reconstruct a current block or a current picture.

The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

As described above, one or two reference picture list may be used for the inter-prediction of the current block. That is, for the inter-prediction of the current block, the reference picture list 0 or the reference picture list 1 may be used, or both of the reference picture list 0 and the reference picture list 1 may be constructed. For example, if the slice type of the slice including the current block is B (B slice), at least one of the aforementioned two reference picture lists may be used, while if the slice type of the slice including the current block is P (P slice), only the reference picture list 0 may be used. The reference picture list 0 may be called an L0 (List 0), and the reference picture list 1 may be called an L1 (List 1). In performing the prediction on the current block, the motion information on the inter-prediction may be bi-prediction motion information or uni-prediction motion information. The motion information on the current block may be derived based on the neighboring block of the current block. Here, the bi-prediction motion information may include an L0 reference picture index and an L0 motion vector (L0 motion information), and an L1 reference picture index and an L1 motion vector (L1 motion information), and the uni-prediction motion information may include an L0 reference picture index and an L0 motion vector (L0 motion information), or may include an L1 reference picture index and an L1 motion vector (L1 motion information). The L0 represents a reference picture list L0 (List 0), and the L1 represents a reference picture list L1 (List 1). The inter-prediction performed based on the L0 motion information may be called L0 prediction, the inter-prediction performed based on the L1 motion information may be called L1 prediction, and the inter-prediction performed based on the L0 motion information and the L1 motion information, that is, the bi-prediction motion information, may be called bi-prediction. Meanwhile, a separate motion vector may be used for each of the L0 prediction and the L1 prediction. That is, for example, the motion vector L0 (MVL0) for the L0 prediction of the current block and the motion vector L1 (MVL1) for the L1 prediction may be derived separately. In this case, for example, if the MVL0 indicates a first reference region in the L0 reference picture within the L0, and the MVL1 indicates a second reference region in the L1 reference picture within the L1, the prediction sample of the current block may be derived through a weighted sum of a first predictor obtained from the reconstructed sample of the first reference region and a second predictor obtained from the reconstructed sample of the second reference region. Here, the weighted sum may be performed based on a first temporal distance between the current picture and the first reference picture and on a second temporal distance between the current picture and the second reference picture. Here, the temporal distance may represent a picture order count (POC) difference. That is, a difference between the POC value of the current picture and the POC value of the L0 reference picture may be the first temporal distance, and a difference between the POC value of the current picture and the POC value of the L1 reference picture may be the second temporal distance.

Meanwhile, according to the present disclosure, if the above-described bi-prediction is applied, the sample unit motion vector or block unit motion vector may be obtained based on the MVL0, the MVL1, the first predictor and the second predictor of the current block, through which the prediction sample of further improved prediction performance may be derived. It may be called bi-prediction optical flow (BIO) prediction, and said prediction sample may be called a refined prediction sample or a BIO prediction sample, being distinguished from the existing prediction sample. Further, the sample unit motion vector or the block unit motion vector may be called a refined motion vector or a BIO motion vector. If the block unit motion vector is derived, a target block from which the block unit motion vector is derived may have a preset size of Bw×Bh. For example, the size of the target block may be preset as 4×4. In this case, the refined motion vectors for the target blocks of 4×4 size included in the current block may be derived. Meanwhile, the target block of the current block may be represented as a sub-block of the current block.

The refined motion vector and the refined prediction sample may be derived, for example, through the following method.

A motion of an object along an optical flow (OF) may be expressed by the following equation if the brightness constancy constraint (BCC), i.e., that there is no variation in a sample (pixel) value of the object in consecutive frames, is assumed.

$$I(x, y, t) = I(x + \Delta x, y + \Delta y, t + \Delta t).$$ [Equation 1]

where I(x,y,t) represents a sample value at a sample position (x, y) and at time t, and Δ represents a variation amount. If it is assumed that the motion is small, the right term of foregoing Equation 1 may be expressed as a first order equation of Taylor series as follows.

$$I(x, y, t) = I(x, y, t) = +\frac{\partial I}{\partial x}\Delta x + \frac{\partial I}{\partial y}\Delta y + \frac{\partial I}{\partial t}\Delta t$$ [Equation 2]

Here, Equation 2 may be divided by Δt and summarized as follows.

$$0 = \frac{dI}{dt} = \frac{\partial I}{\partial x}V_x + \frac{\partial I}{\partial y}V_y + \frac{\partial I}{\partial t},$$ [Equation 3]

where $V_x = \Delta x/\Delta t$ and $V_y = \Delta y/\Delta t$.

The foregoing equation includes two unknowns (spatial derivatives of motion and signal). Therefore, the spatial derivative is necessary for motion analysis.

According to the present disclosure, by using optical flow (OF) characteristics, the reference sample value and the motion vector refined on a sample (pixel) basis or a specific block basis may be obtained without transmitting an additional motion vector. For example, in addition to the BCC, if the object moves at a constant speed for a short period of time, the MVL0 and the MVL1 may be expressed as symmetric values of the same magnitude. In other words, the x components of the MVL0 and the MVL1 may have the same magnitude and different signs from each other, or the y components of the MVL0 and the MVL1 may have the same magnitude and different signs from each other. For example, if the x component and the y component of the MVL0 are $V_x$ and $V_y$, respectively, the x component and the y component of the MVL1 may be $-V_x$ and $-V_y$, respectively.

Figure 3:
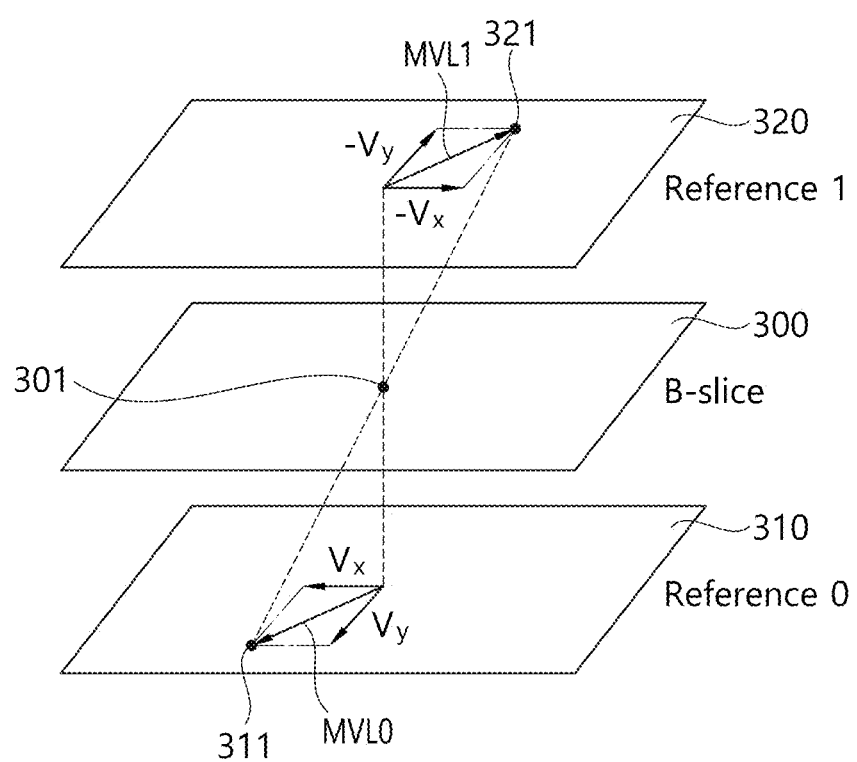
FIG. 3 illustratively represents bi-prediction motion vectors under the assumption of the BCC and that an object moves at a constant speed for a short period of time.

FIG. 3 illustratively represents bi-prediction motion vectors under the assumption of the BCC and that an object moves at a constant speed for a short period of time.

With reference to FIG. 3, in the bi-prediction of the current block in a current picture 300 under the assumption of the BCC and that the object moves at a constant speed for a short period of time, the MVL0 represents a motion vector which indicates a first reference block in a first reference picture (Reference 0) 310 corresponding to the current block, and the MVL1 represents a motion vector which indicates a second reference block in a second reference picture (Reference 1) 320 corresponding to the current block. The first reference picture may be one of reference pictures included in the L0, and the second reference picture may be one of reference pictures included in the L1. In this case, the representative location of the respective blocks may be a top-left sample position of each of the blocks. In this case, the MVL0 and the MVL1 may be expressed by mutually symmetric values.

In FIG. 3, a first reference sample value of a position 311 according to the MVL1 and a second reference sample value of a location 321 according to the MVL1 may be derived based on a target sample 301 in the current block. Herein, the first reference sample value may be called a first predictor or an L0 predictor, the second reference sample value may be called a second predictor or an L1 predictor. A difference between the first reference sample value and the second reference sample value may be summarized as in an equation below.

$$\Delta[i, j] = I^0[i + v_x, j + v_y] - I^1[i - v_x, j - v_y],$$ [Equation 4]

where $I^{(0)}[i+v_x, j+V_y]$ represents a sample value at the sample position 311 of the first reference picture (Reference 0) 310 (i.e. the first reference sample value), and $I^{(1)}[i-v_x, j-V_y]$ represents a sample value at the sample position 321 of the second reference picture (Reference 1) 320 (i.e. the second reference sample value). The sample values may be represented by equations below.

$$I^0[i+v_x, j+v_y] = I^0[i,j] + \frac{\partial I^0[i,j]}{\partial x}v_x + \frac{\partial I^0[i,j]}{\partial y}v_y \quad \text{[Equation 5]}$$

$$I^1[i-v_x, j-v_y] = I^1[i,j] - \frac{\partial I^1[i,j]}{\partial x}v_x - \frac{\partial I^1[i,j]}{\partial y}v_y$$

And by substituting foregoing Equation 5 to Equation 4, it may be summarized and expressed as in Equation 6 below.

$$\Delta[i,j] = I^0[i,j] - I^1[i,j] + \quad \text{[Equation 6]}$$
$$v_x[i,j](I_x^{(0)}[i,j] + I_x^{(1)}[i,j]) + v_y[i,j](I_y^{(0)}[i,j] + I_y^{(1)}[i,j]),$$

where $I^{(0)}[i,j]$ represents the L0 reference sample value, $I^{(1)}[i,j]$ represents the L1 reference sample value, and $I_x^{(k)}[i,j]$ and $I_y^{(k)}[i,j]$ represent x-axis and y-axis variation amounts, respectively, that is, a gradient. Specifically, $I_x^{(0)}[i,j]$ and $I_y^{(0)}[i,j]$ are an x-axis and a y-axis partial differential values, respectively, at a position [i,j] of the first reference picture (reference 0) 310 in the L0, and $I_x^{(1)}[i,j]$ and $I_y^{(1)}[i,j]$ are an x-axis and a y-axis partial differential values, respectively, at a position [i,j] of the second reference picture (reference 1) 320 in the L1. The partial differential value may be called a gradient.

Meanwhile, in order to improve the accuracy and the prediction efficiency, the gradients may be expressed as in Equation 7 below based on an interpolation filter. Meanwhile, a position and/or unit to which the filter coefficient of the interpolation filter is allocated may be referred to as a filter tab. The filter coefficient of the interpolation filter may be allocated on a ¼ fractional sample basis.

$$I_x^{(k)}[i,j] = \sum_{n=-M+1}^{M} dF_n(\alpha_x^{(k)})R^{(k)}[i+n,j], k = 0 \text{ or } 1 \quad \text{[Equation 7]}$$

$$I_y^{(k)}[i,j] = \sum_{n=-M+1}^{M} dF_n(\alpha_y^{(k)})R^{(k)}[i+n,j], k = 0 \text{ or } 1,$$

where 2M represents the number of filter taps of the interpolation filter, $a_x^{(k)}$ and $a_y^{(k)}$ represent fractional parts of an x component and a y component of the motion vector, respectively, $dF_n(a_x^{(k)})$ and $dF_n(a_y^{(k)})$ represent filter coefficients of nth filter tap of $a_x^{(k)}$ and $a_y^{(k)}$, respectively, and $R^{(k)}[i+n,j]$ $R^{(k)}[i+n,j]$ presents a reconstruction sample value at a position [i+n,j] after the bi-prediction, that is, a reference sample value at a position [i+n,j] of the reference picture. A value of the fractional part of the x component and/or the y component of the motion vector may be one of 0, ¼, 2/4, and ¾.

Specifically, $\alpha_x^{(0)}$ $a_x^{(0)}$ and $\alpha_y^{(0)}$ $a_y^{(0)}$ represent fractional parts of an x component and a y component of the MVL0, respectively, $dF_n(a_x^{(0)})$ and $dF_n(a_y^{(0)})$ represent filter coefficients of nth filter tap at $a_x^{(0)}$ and $a_y^{(0)}$, respectively, and $R^{(0)}[i+n,j]$ presents the reference sample value at a position [i+n,j] of the first reference picture (Reference 0) 310. In addition, $a_x^{(1)}$ and $a_y^{(1)}$ represent fractional parts of an x component and a y component of the MVL1, respectively, $dF_n(\alpha_x^{(1)})$ $dF_n(a_x^{(1)})$ and $dF_n(\alpha y^{(1)})$ $dF_n(a_y^{(1)})$ represent filter coefficients of nth filter tap at $a_x^{(1)}$ and $a_y^{(1)}$, respectively, and $R^{(1)}[i+n,j]$ presents the reference sample value at a position [i+n,j] of the second reference picture (Reference 1) 320.

As an example, if the number of the filter taps is six (i.e., if the 2M is 6), the filter tap coefficient of the interpolation filter for the fractional parts of the x component and the y component of the motion vector may be defined as in a table below.

TABLE 1

| Fractional pel position | Interpolation filter for gradient |
| --- | --- |
| 0 | {8, −39, −3, 46, −17, 5}, |
| ¼ | {4, −17, −36, 60, −15, 4}, |
| 2/4 | {−1, 4, −57, 57, −4, 1}, |
| ¾ | {−4, 15, −60, 36, 17, −4} |

The sample unit motion vectors $v_x[i,j]$ and $v_y[i,j]$ which make $\Delta^2[i,j]$ have the minimum value may be calculated based on foregoing Equation 6. For example, it may be assumed that samples within a specific region centering at [i,j], that is, a window $\Omega$, have a locally steady motion. Herein, the window $\Omega$ may include (2M+1)×(2M+1) samples. In this case, a sample position within the window $\Omega$ may be represented as [i',j']. At this time, at [i',j'], i−M≤i'≤i+M, and j−M≤j'≤j+M are satisfied. The motion vector which minimizes $\Sigma_{106} \Delta^2[i',j']$ may be calculated based on that. In this case, when the assumption that the samples within the window $\Omega$ have the locally steady motion is taken into consideration, the $\Delta^2[i,j]$ may be expressed as in the following equation.

$$\sum_{\Omega} \Delta 2(i',j') = \left(Vx\sum_{\Omega} Gx + Vy\sum_{\Omega} Gy + \sum_{\Omega} \delta P\right)^2, \quad \text{[Equation 8]}$$

where $G_x = (I_x^{(0)}[i',j'] + I_x^{(1)}[i',j'])$, $G_y = (I_y^{(0)}[i',j'] + I_y^{(1)}[i',j'])$ and $\delta P = (P^{(0)}[i',j'] - P^{(1)}[i',j'])$.

Herein, $P^{(0)}[i',j']$ and $P^{(1)}[i',j']$ represent the L0 predictor and the L1 predictor, respectively. The $P^{(0)}[i',j']$ and the $P^{(1)}[i',j']$ correspond to $I^0[i',j']$ and $I^1[i',j']$, respectively.

If foregoing Equation 7 is partially differentiated by $v_x$ and $V_y$, respectively, it may be summarized as follows.

$$Vx\sum_{\Omega} G^2x + Vy\sum_{\Omega} GxGy + \sum_{\Omega} Gx\delta P = 0 \quad \text{[Equation 9]}$$
$$Vx\sum_{\Omega} GxGy + Vy\sum_{\Omega} G^2y + \sum_{\Omega} Gy\delta P = 0,$$

where $s1 = \sum_{\Omega} G^2x,$ $s2 = s4 = \sum_{\Omega} GxGy,$ $s3 = -\sum_{\Omega} Gx\delta P,$ $s5 = \sum_{\Omega} G^2y,$ and $s6 = -\sum_{\Omega} Gy\delta P,$ and if the s1, the s2, the s3, and the s4 are substituted to foregoing Equation 9, it may be summarized and expressed as in Equations 10 and 11 below.

$$0 = \sum_{|i',j|\in\Omega} 2G_x(v_xG_x + v_yG_y + \delta P)$$ [Equation 10]

$$0 = \sum_{|i',j|\in\Omega} 2v_xG_x^2 + 2v_yG_xG_y + 2G_x\delta P$$

$$0 = 2v_x \sum_{|i',j|\in\Omega} G_x^2 + 2v_y \sum_{|i',j|\in\Omega} G_xG_y + 2\sum_{|i',j|\in\Omega} G_x\delta P$$

$$0 = 2v_xs_1 + 2v_ys_2 - 2s_3$$

$$v_x = \frac{-v_ys_2 + s_3}{s_1}$$

$$0 = \sum_{|i',j|\in\Omega} 2G_y(v_xG_x + v_yG_y + \delta P)$$ [Equation 11]

$$0 = \sum_{|i',j|\in\Omega} (2v_xG_xG_y + 2v_yG_y^2 + 2G_y\delta P)$$

$$0 = 2v_x \sum_{|i',j|\in\Omega} G_xG_y + 2v_y \sum_{|i',j|\in\Omega} G_y^2 + 2\sum_{|i',j|\in\Omega} G_y\delta P$$

$$0 = 2v_xs_4 + 2v_ys_5 - 2s_6$$

$$v_y = \frac{-v_xs_4 + s_6}{s_5}$$

If Vx and Vy are summarized based on foregoing Equations 10 and 11, they will be respectively as follows.

$$v_x = \frac{\frac{-v_xs_4+s_6}{s_5}s_2 + s_3}{s_1} = \frac{s_3s_5 - s_2s_6}{s_1s_5 - s_2s_4}$$ [Equation 12]

$$v_y = \frac{-\frac{-v_ys_2+s_3}{s_1}s_4 + s_6}{s_5} = \frac{s_1s_6 - s_3s_4}{s_1s_5 - s_2s_4}$$

That is, the $v_x$ and the Vy may be summarized as follows.

$$Vx = \frac{s3s5 - s2s6}{s1s5 - s2s4}, \quad Vy = \frac{s1s6 - s3s4}{s1s5 - s2s4}$$ [Equation 13]

Therefore, the refined predictor for a target sample, that is, the refined prediction sample, may be calculated as follows using the $v_x$ and the Vy.

$$P = ((P^{(0)} + P^{(1)}) + V_x(I_x^{(0)} - I_x^{(1)}) + V_y(I_y^{(0)} - I_y^{(1)})) \gg 1$$ [Equation 14]

The refined prediction sample and the refined motion vector of a sample unit may be obtained based on the same method as described above. Herein, P represents the refined prediction sample of the target sample, and $v_x$ and Vy represent an x component and a y component of the refined motion vector of the target sample, respectively.

Meanwhile, the above-described method is a method in which the constant motion of two symmetric motion vectors (i.e., the MVL0 and the MVL1) of the same magnitude is assumed. In other words, the above-described method of deriving a refined prediction sample may be a method in which it is assumed that the first temporal distance between the current picture and the first reference picture associated with the MVL0, and the second temporal distance between the current picture and the second reference picture associated with the MVL1 are the same. The difference between the POC value of the current picture and the POC value of the first reference picture may become the first temporal distance, and the difference between the POC value of the second reference picture and the POC value of the second reference picture may become the second temporal distance.

A method in which the refined prediction sample is derived, taking into consideration the two motion vectors that have a constant motion when the first temporal distance is not the same as the second temporal distance, may be described as below.

For example, if foregoing Equation 14 is calculated again in view of the value of the first temporal distance being not the same as that of the second temporal distance, it may be expressed as follows.

$$P = ((P^{(0)} + P^{(1)}) + V_x(\tau_0 I_x^{(0)} - \tau_1 I_x^{(1)}) + V_y(\tau_0 I_y^{(0)} - \tau_1 I_y^{(1)})) \gg 1,$$ [Equation 15]

where P represents the refined predictor for the target sample, P(0) and P(1) represent a first predictor and a second predictor for the current sample, respectively, $I_x^{(0)}$ and $I_y^{(0)}$ represent an x-axis gradient and a y-axis gradient in the first predictor, respectively, $I_x^{(1)}$ and $I_y^{(1)}$ represent an x-axis gradient and a y-axis gradient in the second predictor, respectively, Vx and Vy represent an x component and a y component of the refined motion vector for the target sample, respectively, $\tau_0$ represents the first temporal distance, and $\tau_1$ represents the second temporal distance. The first temporal distance and the second temporal distance may represent a distance between the current picture (or current frame) and the reference picture (or reference frame).

The first temporal distance and the second temporal distance may be derived based on the following equation.

$$\tau_0 = POC(\text{current}) - POC(Ref0)$$
$$\tau_1 = POC(Ref1) - POC(\text{current}),$$ [Equation 16]

where POC(current) represents a picture order count (POC) value of the current picture, POC(Ref0) represents a POC value of the first reference picture, and POC(Ref1) represents a POC value of the second reference picture.

Meanwhile, in order to reduce the computational complexity in the method of deriving a refined prediction sample, foregoing Equation 13 may be approximated and used. The approximated equation of foregoing Equation 13 may be derived as follows.

The following equation may be derived by dividing the numerator and the denominator of Vx in foregoing Equation 13 with s5.

$$Vx = \frac{s3 - s2s6/s5}{s1 - s2s4/s5}$$ [Equation 17]

If the value of s5 of foregoing Equation 17 is sufficiently great, the denominator of foregoing Equation 17, s2*s6/s5, and the numerator thereof, s2*s4/s5, may be approximated to zero. Therefore, Equation 17 may be expressed as the following equation.

$$Vx = \frac{s3}{s1}$$ [Equation 18]

If the Vx derived through foregoing Equation 18 is substituted to the Vy of foregoing Equation 11, the Vy may be derived based on the following equation.

$$Vy = \frac{s6 - Vx * s4(=s2)}{s5} \quad \text{[Equation 19]}$$

The Vy may be summarized as follows based on foregoing Equation 19.

$$Vy = \frac{s6 - Vx * s2}{s5} \quad \text{[Equation 20]}$$

It is possible to reduce the complexity of computation for deriving the $v_x$ and the Vy based on foregoing Equations 18 and 20, through which the entire computational complexity of the method of deriving a refined prediction sample can be reduced.

Meanwhile, while the BIO prediction deriving a refined motion vector of a sample unit may be applied as described above, the BIO prediction deriving a refined motion vector of a block unit may be proposed. The BIO prediction performing refinement on a block basis may reduce computational complexity compared to the BIO prediction performing refinement on a sample basis.

For example, if both of the width Bw and the height Bh of a target block on which the refinement is performed are preset 4, the predictor may be refined on a block basis of 4×4 size. In the BIO prediction in which the refinement is performed on a sample basis, a gradient map for each of samples may be generated as described above, an offset for each of samples may be derived, and the refined prediction sample may be derived by adding the offset to the predictor for each of samples based on foregoing Equation 14. However, in the BIO prediction in which the refinement is performed on a block basis (it may be referred to as block based BIO prediction), an offset in a target block of 4×4 size may be derived, and the same offset may be added to the predictors of the target samples included in the target block. That is, the same refined motion vector may be applied to the target block.

Figure 4:
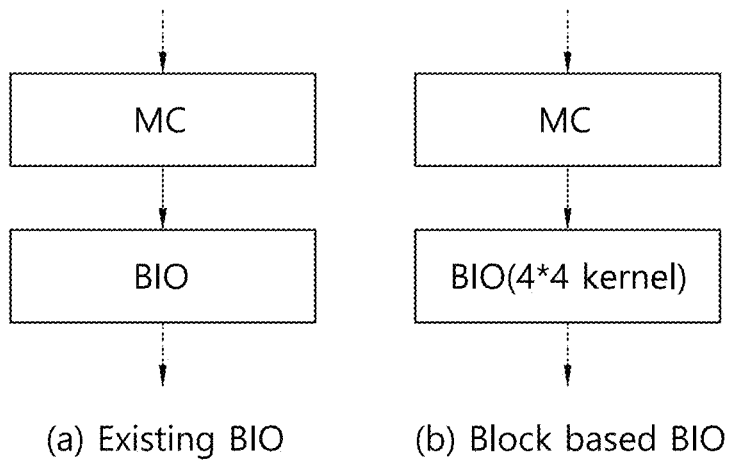
FIG. 4 represents an example where a sample based BIO prediction and a block based BIO prediction are performed.

FIG. 4 represents an example where a sample based BIO prediction and a block based BIO prediction are performed. Referring to FIG. 4, if the size of a target block on which the refinement is performed is preset as Bw×Bh (e.g., 4×4), an x-axis, an y-axis, a time axis gradient maps of a reference sample value of the target block of a w×h size may be derived based on the MVL0 and the MVL1 derived through an encoding/decoding process. After this, the offset for the target sample included in the target block may be derived based on the gradient map for the target block. The offset of the target block unit may be derived based on a Bw×Bh kernel, and the refined prediction sample for the target sample may be derived by adding the offset to the predictor for the target sample.

Specifically, the block-unit refined motion vector may be derived based on the gradients of the target samples (i.e., a gradient map of the target block) included in the target block of the current block. The block-unit refined motion vector may be derived on a target block basis of the current block, and the block-unit refined motion vector may be represented as the refined motion vector for the target block of the current block. For example, the sum of $s_n$ of target samples included in the target block of the current block may be derived as sn of the target block. The sn for the target block may be represented as $S_{n,bk}$. For example, $S_{1,bk}, S_{2,bk}, S_{3,bk}, S_{4,bk}, S_{5,bk}$ and $s_{6,bk}$ for the target block may be derived as the following equation.

$$S_{1,bk} = \sum_{b_k} \sum_{\Omega} (Gx)^2 \quad \text{[Equation 21]}$$
$$S_{2,bk} = S_{4,bk} \sum_{b_k} \sum_{\Omega} GxGy$$
$$S_{3,bk} = -\sum_{b_k} \sum_{\Omega} Gx\delta P \quad ,$$
$$S_{5,bk} = \sum_{b_k} \sum_{\Omega} (Gy)^2$$
$$S_{6,bk} = -\sum_{b_k} \sum_{\Omega} Gy\delta P$$

where $$Gx = (\tau_0 I_x^{(0)}[i', j'] + \tau_1 I_x^{(1)}[i', j']),$$
$$Gy = (\tau_0 I_y^{(0)}[i', j'] + \tau_1 I_y^{(1)}[i', j']) \text{ and}$$
$$\delta P = (P^{(0)}[i', j'] - P^{(1)}[i', j']).$$

After this, the refined motion vector for the target block may be derived based on an equation obtained by inserting $(S_{n,bk} \gg n)$ in place of sn into foregoing Equation 13 or foregoing Equations 18 and 20. For example, if the size of the target block from which the block-unit motion vector is derived is 4×4, the refined motion vector for the target block may be derived based on an equation obtained by inserting $(S_{n,bk} \gg 16)$ instead of sn into foregoing Equation 13. If the size of the target block is 4×4, the block-unit refined motion vector may be derived based on the following equation.

$$V_{x,bk} = \frac{(s_{3,b_k} \gg 16)(s_{5,b_k} \gg 16) - (s_{2,b_k} \gg 16)(s_{6,b_k} \gg 16)}{(s_{1,b_k} \gg 16)(s_{5,b_k} \gg 16) - (s_{2,b_k} \gg 16)(s_{4,b_k} \gg 16)} \quad \text{[Equation 22]}$$

$$V_{y,bk} = \frac{(s_{1,b_k} \gg 16)(s_{6,b_k} \gg 16) - (s_{3,b_k} \gg 16)(s_{4,b_k} \gg 16)}{(s_{1,b_k} \gg 16)(s_{5,b_k} \gg 16) - (s_{2,b_k} \gg 16)(s_{4,b_k} \gg 16)}$$

Alternatively, the block-unit refined motion vector may be derived based on an approximated equation. That is, the refined motion vector for the target block may be derived based on an equation obtained by inserting $(S_{n,bk} \gg n)$ in place of sn into foregoing Equations 18 and 20. If the size of the target block is 4×4, the block-unit refined motion vector may be derived based on the following equation.

$$V_{x,bk} = \frac{(s_{3,b_k} \gg 16)}{(s_{1,b_k} \gg 16)} \quad \text{[Equation 23]}$$

$$V_{y,bk} = \frac{(s_{6,b_k} \gg 16) - V_{x,bk}(s_{2,b_k} \gg 16)}{(s_{5,b_k} \gg 16)}$$

After this, the refined prediction sample for the target sample may be derived by substituting $V_{x,bk}$ for $V_x$ and $V_{y,bk}$ for $V_y$ in foregoing Equation 14.

Meanwhile, the present disclosure proposes a method of adaptively applying the BIO prediction based on a specific condition for the current block. Though this, it is possible to improve the coding efficiency by optimizing the inter-prediction in which the BIO prediction, in particular, the block-based BIO prediction is applied.

As an example, the determination may be made based on the size of the current block as to whether the above-described BIO prediction is applied. For example, if the size of the current block is W×H, the determination may be made based on the size of the current block and the preset critical value as to whether the prediction is applied.

For example, if the width of the current block is the same as the critical value for the width, and the height of the current block is the same as the critical value for the height, it may be determined that the BIO prediction is not applied to the current block. Alternatively, if the current block size W×H is less than the preset minimum size N×M, it may be determined that the BIO prediction is not applied to the current block. Alternatively, if the number of samples of the current block is less than the preset critical value, it may be determined that the BIO prediction is not applied to the current block.

Specifically, for example, if the size of the current block is 4×4, the BIO prediction may not be applied to the current block.

Figure 5:
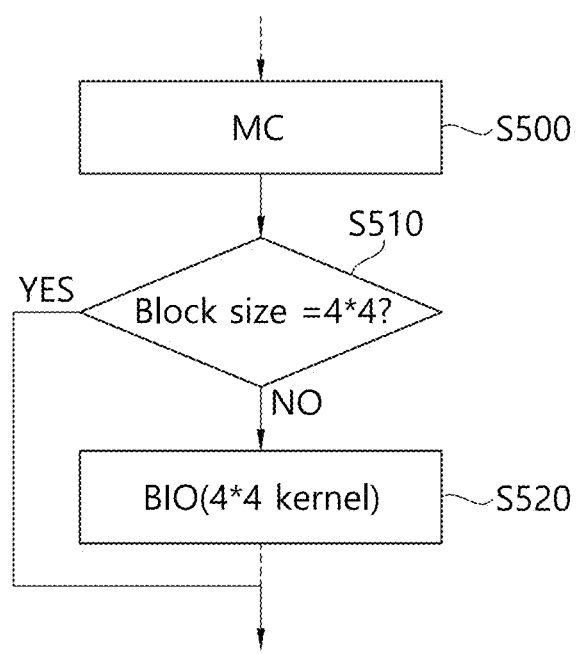
FIG. 5 represents an example where the determination is made based on the size of the current block as to whether the BIO prediction is applied.

FIG. 5 represents an example where the determination is made based on the size of the current block as to whether the BIO prediction is applied.

The encoding device/decoding device may derive a motion vector for the current block (S500). The motion vector may include the MVL0 and the MVL1.

The encoding device/decoding device may determine whether the size of the current block is 4×4 (S510). If the size of the current block is 4×4, the BIO prediction for the current block may not be performed. In this case, the inter-prediction for the current block may be performed based on the derived motion vector.

If the size of the current block is not 4×4, the encoding device/decoding device may perform the block-based BIO prediction on the current block (S520). In this case, the target block from which the block unit motion vector is derived may have a size of 4×4. That is, the encoding device/decoding device may derive the refined motion vector for the target block having a size of 4×4 and included in the current block, and may derive the refined prediction sample for the target sample included in the target block of the current block based on the refined motion vector.

Figure 6:
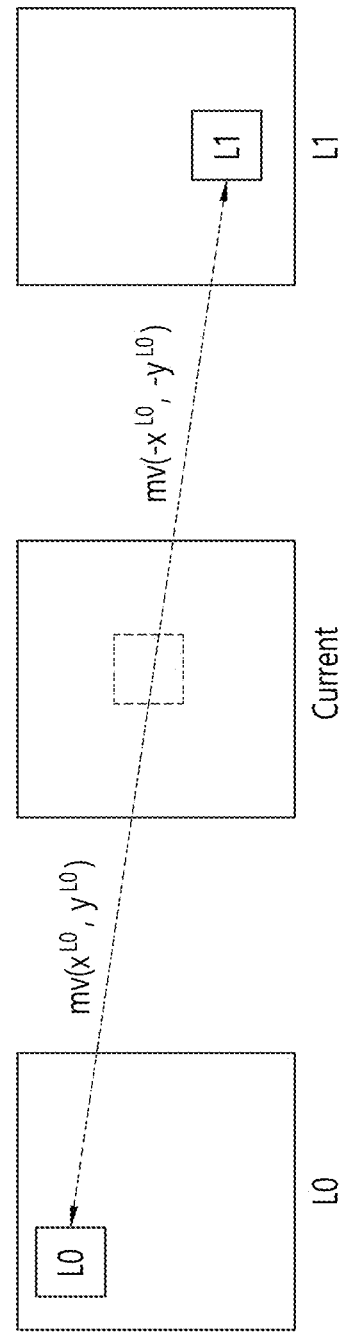
FIG. 6 illustratively represents an example of deriving a motion information through the BM method.

Meanwhile, in the process of deriving the motion information of the current block, frame rate up-conversion (FRUC) may be applied, and the BIO prediction may be performed based on the motion information derived through the FRUC. The FRUC may be called pattern matched motion vector derivation (PMMVD). The FRUC may represent a method of deriving motion information through a template matching (TM) method or a bilateral matching (BM) method under the assumption that an object moves at a constant speed in an image, and that there is no variation in the pixel value (sample value). Its specifics may be described as follows:

FIG. 6 illustratively represents an example of deriving a motion information through the BM method. If the FRUC is applied to the current block, MVL0 and MVL1 for the current block may be selected sequentially one by one, and then motion vectors corresponding to the motion vectors of a direction of the L0 and the L1 directions, which is different from a direction associated with the motion vectors, may be derived by performing interpolation around the picture which the current block belongs to.

Specifically, the encoding device/decoding device may derive the motion information candidate list of the current block based on the neighboring blocks of the current block. The motion vector candidate of the neighboring block may be a bi-prediction motion vector candidate or a uni-prediction motion vector candidate. The encoding device/decoding device may classify the motion vectors included in the motion vector candidate, diving them into the L0 direction and the L1 direction. That is, the encoding device/decoding device may classify the motion vectors in the motion vector candidate into the MVL0 and the MVL1.

After this, the classified motion vectors are selected sequentially one by one, and then motion vectors corresponding to the motion vectors of a direction of the L0 and the L1 directions, which is different from a direction associated with the motion vectors, may be derived by performing interpolation around the picture which the current block belongs to.

For example, if the motion vector candidate of the current block is MVL0, the MVL1 corresponding to the MVL0 may be derived by scaling based on the temporal distance between the L0 reference picture for the MVL0 and the current picture including the current block, and the temporal distance between the L1 reference picture and the current picture. In other words, the MVL1 may be derived by scaling the MVL0 based on the first temporal distance between the L0 reference picture for the MVL0 and the current picture, and the second temporal distance between the L1 reference picture and the current picture. Herein, the first temporal distance may be a difference value between the POC of the L0 reference picture and the POC of the current picture, and the second temporal distance may be a difference value between the POC of the L1 reference picture and the POC of the current picture. Further, the L1 reference picture may be derived from among the L1 reference pictures included in the L1. For example, the L1 reference picture may be derived as a reference picture including a reference region, among the L1 reference pictures included in the L1, which has the smallest difference value between a reference region which the MVL0 indicates and a reference region which the derived MVL1 indicates, that is, the smallest residual. The difference value between the reference region which the MVL0 indicates, and the reference region which the derived MVL1 indicates may be represented as a cost for the motion vector candidate.

Further, for example, if the motion vector candidate of the current block is MVL1, the MVL0 corresponding to the MVL1 may be derived by scaling based on the temporal distance between the L1 reference picture for the MVL1 and the current picture including the current block, and the temporal distance between the L0 reference picture and the current picture. In other words, the MVL1 may be derived by scaling the MVL1 based on the first temporal distance between the L1 reference picture for the MVL1 and the current picture, and the second temporal distance between the L0 reference picture and the current picture. Herein, the first temporal distance may be a difference value between the POC of the L1 reference picture and the POC of the current picture, and the second temporal distance may be a difference value between the POC of the L0 reference picture and the POC of the current picture. TD0 shown in FIG. 6 represents the first temporal distance, and TD1 represents the second temporal distance. Further, the L0 reference picture may be derived from among the L0 reference pictures included in the L0. For example, the L0 reference picture may be derived as a reference picture including a reference region, among the L0 reference pictures included in the L0, which has the smallest difference value between a reference region which the MVL1 indicates and a reference region which the derived MVL0 indicates, that is, the smallest residual. The difference value between the reference region which the MVL1 indicates and the reference region which the derived MVL0 indicates may be represented as a cost.

The encoding device/decoding device may derive the costs for the motion vector candidate, and may derive, as the motion information of the current block, the motion vector candidate which has the smallest cost (bi-prediction motion information including the MVL0 and the MVL1).

Meanwhile, if the FRUC is applied to the current block, the motion information of the current block may be derived through the TM method.

FIG. 7 illustratively represents an example of deriving a motion information through the TM method. Referring to FIG. 7, a reference block for a template most similar to the template of the current block among the L0 reference blocks included in the L0 reference picture may be derived as the L0 reference block for the current block, and the motion vector which indicates the L0 reference block may be derived as the MVL0 for the current block. In other words, a reference block for a template, among the reference blocks included in the L0 reference picture, which has the smallest cost with the template of the current block, may be derived as the L0 reference block for the current block, and the motion vector which indicates the L0 reference block may be derived as the MVL0 for the current block.

The template of the current block may include a left neighboring region and/or a top neighboring region of the current block, the template of the L0 reference block may be a region corresponding to the template of the current block, and the template of the reference block may include a left neighboring region and/or a top neighboring region of the reference block. The cost for the reference block may be derived as the sum of absolute differences (SAD) between the template of the current block and the template of the reference block.

The cost may derived based on the following equation:

$$\text{Cost}_{distortion} = \sum_{(i,\,j) \in TemplateSize} |\text{Temp}_{ref}(i,\,j) - \text{Temp}_{cur}(i,\,j)|, \quad [\text{Equation 24}]$$

where i and j represent a position (i,j) of a sample within a template of a block, Costdistortion represents the cost, Tempref represents a sample value of a template of the reference block, and Tempeur represents a sample value of a template of the current block. The differences between the corresponding samples between the template of the reference block and the template of the current block may be accumulated, and the accumulation of differences may be used as the cost for the reference block. The L0 reference block, among the L0 reference blocks included in the L0 reference picture, which has the smallest cost, may be derived as the L0 reference block for the current block, and the motion vector which indicates the L0 reference block may be derived as the MVL0 for the current block. The cost may be derived based on the template of the current block and the template of the L0 reference block as described above.

Further, referring to FIG. 7, a reference block for a template most similar to the template of the current block among the L1 reference blocks included in the L1 reference picture may be derived as the L1 reference block for the current block, and the motion vector which indicates the L1 reference block may be derived as the MVL1 for the current block. In other words, a reference block for a template, among the reference blocks included in the L1 reference picture, which has the smallest cost with the template of the current block, may be derived as the L1 reference block for the current block, and the motion vector which indicates the L1 reference block may be derived as the MVL1 for the current block.

The template of the current block may include a left neighboring region and/or a top neighboring region of the current block, the template of the L1 reference block may be a region corresponding to the template of the current block, and the template of the reference block may include a left neighboring region and/or a top neighboring region of the reference block. The cost for the reference block may be derived as the sum of absolute differences (SAD) between the template of the current block and the template of the reference block. The L1 reference block, among the L1 reference blocks included in the L1 reference picture, which has the smallest cost, may be derived as the L1 reference block for the current block, and the motion vector which indicates the L1 reference block may be derived as the MVL1 for the current block. The cost may be derived based on the template of the current block and the template of the L1 reference block as described above.

Meanwhile, the decoding device may obtain information on the matching method for deriving the optimal motion vector from the encoding device, and in this case, the optimal motion vector may be derived according to the matching method. For example, the decoding device may obtain a flag regarding selection of the BM method or the TM method through the bitstream. The flag may be referred to as a BM/TM selection flag. The decoding device may select the matching method based on the value of the flag. For example, if the value of the flag is 1, the decoding device may derive the motion information of the current block by performing the BM method, or if the value of the flag is 0, the decoding device may derive the motion information of the current block by performing the TM method. Alternatively, if the value of the flag is 0, the decoding device may derive the motion information of the current block by performing the BM method, or if the value of the flag is 1, the decoding device may derive the motion information of the current block by performing the TM method.

Figure 8A:
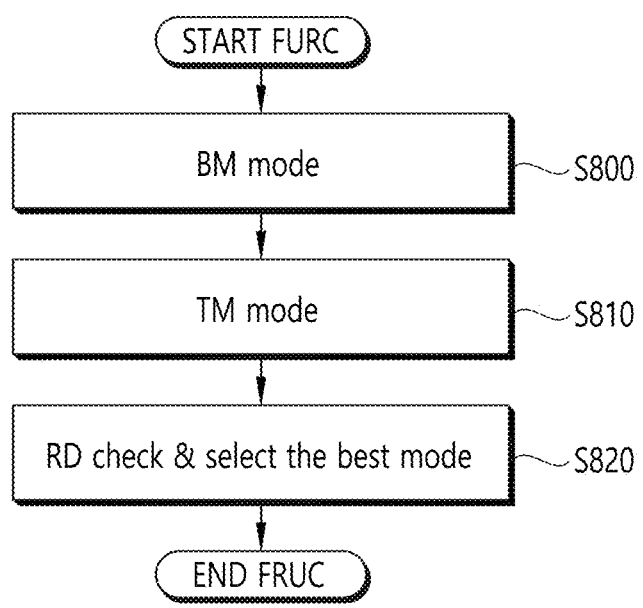
FIGS. 8A and 8B represent an example of an encoding process and a decoding process performed based on FRUC.
Figure 8B:
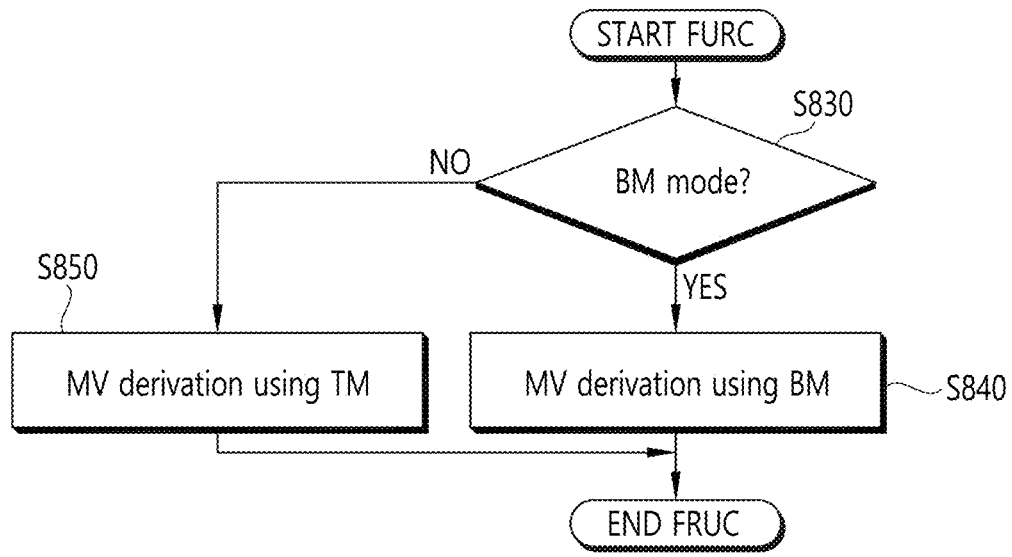

FIGS. 8A and 8B represent an example of an encoding process and a decoding process performed based on FRUC.

FIG. 8A represents an example of an encoding process performed based on FRUC.

Referring to FIG. 8A, the encoding device derives motion information for the current block by applying the BM mode (S800). Meanwhile, the method of deriving the motion information based on the above-described BM method may be represented as a BM mode.

For example, the encoding device may derive the motion information candidate list of the current block based on the neighboring blocks of the current block. The candidate included in the motion information candidate list may include L0 motion information or L1 motion information.

After this, the encoding device may derive the costs for the candidates included in the motion information candidate list through the BM method, and may derive the motion information on the current block based on the candidate having the smallest cost.

The cost for the candidate included in the motion information candidate list may be derived as follows. The encoding device may derive the motion vector corresponding to the motion vector of a direction among th L0 and the L1 directions, which is different from a direction associated with the motion vector, by interpolating the motion vector of the candidate around the current picture, and may derive, as the cost of the candidate, the SAD between the reference block which the motion vector of the candidate indicates, and the reference block which the derived motion vector indicates.

For example, if the motion candidate includes the L0 motion information, the encoding device may derive MVL1 by scaling the MVL0 for the motion candidate based on the first temporal distance and the second temporal distance. The encoding device may derive, as the cost of the motion candidate, the SAD between the L0 reference block which the MVL0 indicates, and the L1 reference block which the MVL1 indicates. Herein, the first temporal distance may be a difference value between the POC of the L0 reference picture for the motion candidate and the POC of the current picture, and the second temporal distance may be a difference value between the POC of the L1 reference picture for the MVL1 and the POC of the current picture.

Further, for example, if the motion candidate includes the L1 motion information, the encoding device may derive the MVL0 by scaling the MVL1 for the motion candidate based on the first temporal distance and the second temporal distance. The encoding device may derive, as the cost of the motion candidate, the SAD between the L1 reference block which the MVL1 indicates, and the L0 reference block which the MVL0 indicates. Herein, the first temporal distance may be a difference value between the POC of the L1 reference picture for the motion candidate and the POC of the current picture, and the second temporal distance may be a difference value between the POC of the L0 reference picture for the MVL0 and the POC of the current picture.

The encoding device may compare the costs of the candidates, and may derive, as the motion information of the current block, the motion information of the candidate having the smallest cost (L0 motion information or L1 motion information) and the motion information derived based on the candidate (L1 motion information or L0 motion information). The derived motion information may represent the motion information derived based on the BM mode.

The encoding device derives motion information for the current block by applying the TM mode (S810). Meanwhile, the method of deriving the motion information based on the above-described TM method may be represented as a TM mode.

The encoding device may derive, as the MVL0 for the current block, the motion vector indicating the L0 reference block for a template, among the L0 reference blocks included in the L0 reference picture, which has the smallest cost with the template of the current block. Herein, the template of the current block may include a left neighboring region and/or a top neighboring region of the current block, the template of the L0 reference block may be a region corresponding to the template of the current block, and the template of the L0 reference block may include a left neighboring region and/or a top neighboring region of the L0 reference block. The cost for the L0 reference block may be derived as the sum of absolute differences (SAD) between the template of the current block and the template of the L0 reference block.

Further, the encoding device may derive, as the MVL1 for the current block, the motion vector indicating the L1 reference block for a template, among the L1 reference blocks included in the L1 reference picture, which has the smallest cost with the template of the current block. Herein, the template of the current block may include a left neighboring region and/or a top neighboring region of the current block, the template of the L1 reference block may be a region corresponding to the template of the current block, and the template of the L1 reference block may include a left neighboring region and/or a top neighboring region of the L1 reference block. The cost for the L1 reference block may be derived as the sum of absolute differences (SAD) between the template of the current block and the template of the L1 reference block.

The encoding device may derive, as the motion information of the current block, the motion information including the L0 motion information and the L1 motion information. The L0 motion information may include a reference picture index indicating the L0 reference picture and the MVL0, and the L1 motion information may include a reference picture index indicating the L1 reference picture and the MVL1.

The encoding device may perform a rate distortion (RD) check on the motion information derived based on the TM mode and the motion information derived based on the BM mode, and may select the optimal mode to the current block from among the BM mode and the TM mode (S820). The encoding device may select a mode applied to the current block from among the BM mode and the TM mode based on the RD cost for the motion information derived based on the TM mode and the motion information derived based on the BM mode. Meanwhile, the encoding device may generate information indicating the selected mode. For example, the encoding device may generate the flag indicating one of the BM mode or the TM mode, and may signal the flag through a bitstream.

FIG. 8B represents an example of a decoding process performed based on FRUC.

Referring to FIG. 8B, the decoding device may determine whether the BM mode is applied to the current block (S830). The decoding device may determine whether the BM mode or the TM mode is applied to the current block. For example, the decoding device may obtain the flag indicating one of the BM mode and the TM mode through a bitstream. The decoding device may derive, as a mode applied to the current block, the mode among the BM mode and the TM mode, which the flag indicates.

If the BM mode is applied to the current block, the decoding device derives the motion information on the current block based on the BM mode (S840).

For example, the decoding device may derive the motion information candidate list of the current block based on the neighboring blocks of the current block. The candidate included in the motion information candidate list may include L0 motion information or L1 motion information.

After this, the decoding device may derive the costs for the candidates included in the motion information candidate list through the BM method, and may derive the motion information on the current block based on the candidate having the smallest cost.

The cost for the candidate included in the motion information candidate list may be derived as follows. The decoding device may derive the motion vector corresponding to the motion vector of a direction among th L0 and the L1 directions, which is different from a direction associated with the motion vector, by interpolating the motion vector of the candidate around the current picture, and may derive, as the cost of the candidate, the SAD between the reference block which the motion vector of the candidate indicates, and the reference block which the derived motion vector indicates.

For example, if the motion candidate includes the L0 motion information, the decoding device may derive MVL1 by scaling the MVL0 for the motion candidate based on the first temporal distance and the second temporal distance. The decoding device may derive, as the cost of the motion candidate, the SAD between the L0 reference block which the MVL0 indicates, and the L1 reference block which the MVL1 indicates. Herein, the first temporal distance may be a difference value between the POC of the L0 reference picture for the motion candidate and the POC of the current picture, and the second temporal distance may be a difference value between the POC of the L1 reference picture for the MVL1 and the POC of the current picture.

Further, for example, if the motion candidate includes the L1 motion information, the decoding device may derive the MVL0 by scaling the MVL1 for the motion candidate based on the first temporal distance and the second temporal distance. The decoding device may derive, as the cost of the motion candidate, the SAD between the L1 reference block which the MVL1 indicates, and the L0 reference block which the MVL0 indicates. Herein, the first temporal distance may be a difference value between the POC of the L1 reference picture for the motion candidate and the POC of the current picture, and the second temporal distance may be a difference value between the POC of the L0 reference picture for the MVL0 and the POC of the current picture.

The decoding device may compare the costs of the candidates, and may derive, as the motion information of the current block, the motion information of the candidate having the smallest cost (L0 motion information or L1 motion information) and the motion information derived based on the candidate (L1 motion information or L0 motion information).

Meanwhile, if the TM mode is applied to the current block, the decoding device derives the motion information on the current block based on the TM mode (S850).

The decoding device may derive, as the MVL0 for the current block, the motion vector indicating the L0 reference block for a template, among the L0 reference blocks included in the L0 reference picture, which has the smallest cost with the template of the current block. Herein, the template of the current block may include a left neighboring region and/or a top neighboring region of the current block, the template of the L0 reference block may be a region corresponding to the template of the current block, and the template of the L0 reference block may include a left neighboring region and/or a top neighboring region of the L0 reference block. The cost for the L0 reference block may be derived as the sum of absolute differences (SAD) between the template of the current block and the template of the L0 reference block.

Further, the decoding device may derive, as the MVL1 for the current block, the motion vector indicating the L1 reference block for a template, among the L1 reference blocks included in the L1 reference picture, which has the smallest cost with the template of the current block. Herein, the template of the current block may include a left neighboring region and/or a top neighboring region of the current block, the template of the L1 reference block may be a region corresponding to the template of the current block, and the template of the L1 reference block may include a left neighboring region and/or a top neighboring region of the L1 reference block. The cost for the L1 reference block may be derived as the sum of absolute differences (SAD) between the template of the current block and the template of the L1 reference block.

The decoding device may derive, as the motion information of the current block, the motion information including the L0 motion information and the L1 motion information. The L0 motion information may include a reference picture index indicating the L0 reference picture and the MVL0, and the L1 motion information may include a reference picture index indicating the L1 reference picture and the MVL1.

Meanwhile, if the motion information of the current block is derived through FRUC as described above, it may further improve the coding efficiency to apply the BIO adaptively based on the mode (BM mode or TM mode) applied to the current block. Specifically, the BM mode of FRUC and the BIO are prediction methods taking Assumptions 1 and 2 to be described later into consideration.

Assumption 1. A target object moves at a uniform speed for a short period time.

Assumption 2. The sample value for the target object is not varied in the consecutive frames.

If the BM mode is applied, the motion vector of each (sub) block may be derived under the consideration of the aforementioned assumptions, and also if the BIO is applied, the offset of each (sub) block (the value derived based on the motion vector of each (sub) block) may be derived under the consideration of the aforementioned assumptions. Therefore, it may further improve the coding efficiency not to redundantly apply the methods that are performed under the same assumptions. So, in a case where FRUC is applied to the current block, if the motion information is derived based on the TM mode, then the BIO is applied, and if the motion information is derived based on the BM mode, then there may be proposed a method in which the BIO is not applied.

Figure 9A:
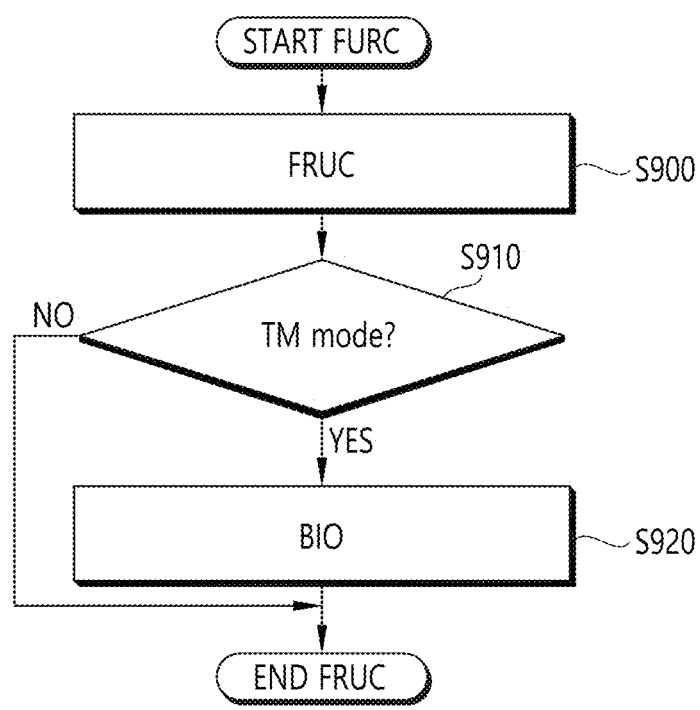
FIGS. 9A and 9B represent an example of encoding/decoding a current block to which FRUC and/or BIO are/or applied.
Figure 9B:
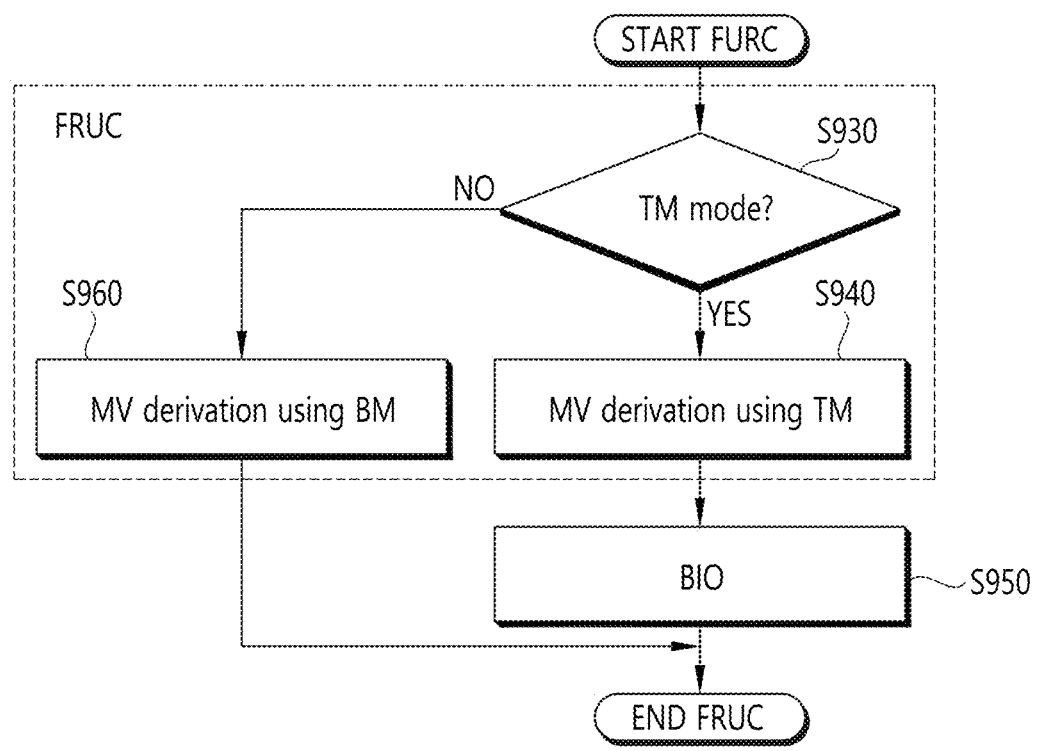

FIGS. 9A and 9B represent an example of encoding/decoding a current block to which FRUC and/or BIO are/or applied.

FIG. 9A represents an example of encoding a current block to which FRUC and/or BIO are/or applied.

Referring to FIG. 9A, the encoding device may derive motion information of the current block by applying FRUC to the current block (S900). The encoding device may derive the motion information on the current block based on the BM mode and the TM mode for the current block. A specific method of deriving the motion information on the current block based on the BM mode is as described above. Further, a specific method of deriving the motion information on the current block based on the TM mode is as described above.

The encoding device may determine whether the TM mode is applied to the current block (S910). The encoding device may compare the motion information derived based on the BM mode with the motion information derived based on the TM mode, and may select the mode applied to the current block.

If the TM mode is applied to the current block, the encoding device may perform the BIO prediction based on the motion information on the current block (S920). The encoding device may perform the BIO prediction based on the motion information derived based on the TM mode. For example, the motion information may include the MVL0 and the MVL1 for the current block, and the encoding device may obtain the block unit refined motion vector for the current block based on the first predictor and the second predictor, and the MVL0 and the MVL1 for the current block. For example, the refined motion vectors for the blocks of 4×4 size included in the current block may be derived. The encoding device may derive the refined motion vector for the target block of the current block based on the first predictor and the second predictor, and the MVL0 and the MVL1 for the current block, and may derive the refined prediction samples based on the refined motion vector.

Specifically, the encoding device may derive the first predictor of a position according to the MVL0 and the second predictor of a position according to the MVL1 based on each of the samples of the target block, and may derive the gradients for the target samples based on the first predictor and the second predictor. After this, the encoding device may derive the refined motion vector of the target block based on the gradients for the samples. For example, the refined motion vector for the target block may be derived based on foregoing Equation 16. The encoding device may derive the refined prediction samples for the target block based on the refined motion vector.

Meanwhile, if the BM mode is applied to the current block, the encoding device may not perform the BIO prediction on the current block, but perform prediction based on the derived motion information.

FIG. 9B represents an example of decoding a current block to which FRUC and/or BIO are/or applied.

Referring to FIG. 9B, the decoding device may determine whether the TM mode is applied to the current block (S930). The decoding device may determine whether the BM mode or the TM mode is applied to the current block. For example, the decoding device may obtain the flag indicating one of the BM mode and the TM mode through a bitstream. The decoding device may derive, as a mode applied to the current block, the mode among the BM mode and the TM mode, which the flag indicates.

Meanwhile, if the TM mode is applied to the current block, the decoding device derives the motion information on the current block based on the TM mode (S940).

The decoding device may derive, as the MVL0 for the current block, the motion vector indicating the L0 reference block for a template, among the L0 reference blocks included in the L0 reference picture, which has the smallest cost with the template of the current block. Herein, the template of the current block may include a left neighboring region and/or a top neighboring region of the current block, the template of the L0 reference block may be a region corresponding to the template of the current block, and the template of the L0 reference block may include a left neighboring region and/or a top neighboring region of the L0 reference block. The cost for the L0 reference block may be derived as the sum of absolute differences (SAD) between the template of the current block and the template of the L0 reference block.

Further, the decoding device may derive, as the MVL1 for the current block, the motion vector indicating the L1 reference block for a template, among the L1 reference blocks included in the L1 reference picture, which has the smallest cost with the template of the current block. Herein, the template of the current block may include a left neighboring region and/or a top neighboring region of the current block, the template of the L1 reference block may be a region corresponding to the template of the current block, and the template of the L1 reference block may include a left neighboring region and/or a top neighboring region of the L1 reference block. The cost for the L1 reference block may be derived as the sum of absolute differences (SAD) between the template of the current block and the template of the L1 reference block.

The decoding device may derive, as the motion information of the current block, the motion information including the L0 motion information and the L1 motion information. The L0 motion information may include a reference picture index indicating the L0 reference picture and the MVL0, and the L1 motion information may include a reference picture index indicating the L1 reference picture and the MVL1.

If the TM mode is applied to the current block, the decoding device may perform the BIO prediction based on the motion information on the current block (S950). The decoding device may perform the BIO prediction based on the motion information derived based on the TM mode. For example, the motion information may include the MVL0 and the MVL1 for the current block, and the decoding device may obtain the block unit refined motion vector for the current block based on the first predictor and the second predictor, and the MVL0 and the MVL1 for the current block. For example, the refined motion vectors for the blocks of 4×4 size included in the current block may be derived. The decoding device may derive the refined motion vector for the target block of the current block based on the first predictor and the second predictor, and the MVL0 and the MVL1 for the current block, and may derive the refined prediction samples based on the refined motion vector.

Specifically, the decoding device may derive the first predictor of a position according to the MVL0 and the second predictor of a position according to the MVL1 based on each of the samples of the target block, and may derive the gradients for the target samples based on the first predictor and the second predictor. After this, the decoding device may derive the refined motion vector of the target block based on the gradients for the samples. For example, the refined motion vector for the target block may be derived based on foregoing Equation 16. The decoding device may derive the refined prediction samples for the target block based on the refined motion vector.

Meanwhile, if the BM mode is applied to the current block, the decoding device derives the motion information on the current block based on the BM mode (S960).

For example, the decoding device may derive the motion information candidate list of the current block based on the neighboring blocks of the current block. The candidate included in the motion information candidate list may include L0 motion information or L1 motion information.

After this, the decoding device may derive the costs for the candidates included in the motion information candidate list through the BM method, and may derive the motion information on the current block based on the candidate having the smallest cost.

The cost for the candidate included in the motion information candidate list may be derived as follows. The decoding device may derive the motion vector corresponding to the motion vector of a direction among th L0 and the L1 directions, which is different from a direction associated with the motion vector, by interpolating the motion vector of the candidate around the current picture, and may derive, as the cost of the candidate, the SAD between the reference block which the motion vector of the candidate indicates, and the reference block which the derived motion vector indicates.

For example, if the motion candidate includes the L0 motion information, the decoding device may derive MVL1 by scaling the MVL0 for the motion candidate based on the first temporal distance and the second temporal distance. The decoding device may derive, as the cost of the motion candidate, the SAD between the L0 reference block which the MVL0 indicates, and the L1 reference block which the MVL1 indicates. Herein, the first temporal distance may be a difference value between the POC of the L0 reference picture for the motion candidate and the POC of the current picture, and the second temporal distance may be a difference value between the POC of the L1 reference picture for the MVL1 and the POC of the current picture.

Further, for example, if the motion candidate includes the L1 motion information, the decoding device may derive MVL0 by scaling the MVL1 for the motion candidate based on the first temporal distance and the second temporal distance. The decoding device may derive, as the cost of the motion candidate, the SAD between the L1 reference block which the MVL1 indicates, and the L0 reference block which the MVL0 indicates. Herein, the first temporal distance may be a difference value between the POC of the L1 reference picture for the motion candidate and the POC of the current picture, and the second temporal distance may be a difference value between the POC of the L0 reference picture for the MVL0 and the POC of the current picture.

The decoding device may compare the costs of the candidates, and may derive, as the motion information of the current block, the motion information of the candidate having the smallest cost (L0 motion information or L1 motion information) and the motion information derived based on the candidate (L1 motion information or L0 motion information). The decoding device may perform prediction on the current block based on the motion information.

Figure 10:
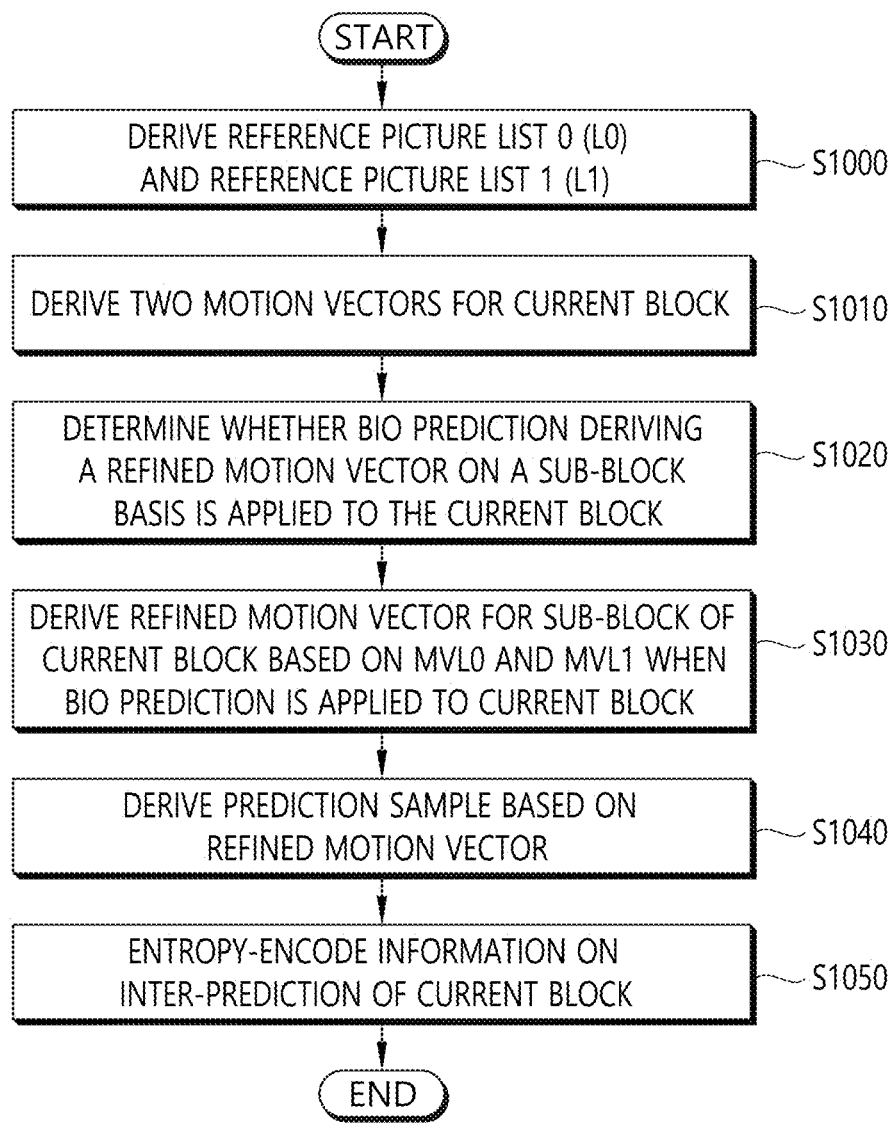
FIG. 10 schematically represents an image encoding method by an encoding device according to the present disclosure.

FIG. 10 schematically represents an image encoding method by an encoding device according to the present disclosure. The method disclosed in FIG. 10 may be performed by the encoding device disclosed in FIG. 1. Specifically, for example, S1000 to S1040 in FIG. 10 may be performed by the predictor of the encoding device, and S1050 may be performed by the entropy encoder of the encoding device.

The encoding device derives the reference picture list 0 (L0) and the reference picture list 1 (L1) (S1000). The encoding device may derive the reference picture list 0 L0 and the reference picture list 1 L1, the reference picture list 0 may be called L0 (List 0), and the reference picture list 1 may be called L1 (List 1).

The encoding device derives two motion vectors (MVs) for the current block, and the two MVs include the MVL0 regarding the L0, and the MVL1 regarding the L1 (S1010). If the current block is included in the B slice, and the bi-prediction is applied to the current block, the encoding device may derive the two MVs. The two MVs may be the MVL0 for the L0 and the MVL1 for the L1.

The encoding device may derive the two MVs for the current block based on the neighboring block of the current block.

For example, the encoding device may generate the motion information candidate list based on the motion information of the neighboring block, and may select the specific candidate from among the candidates included in the motion information candidate list based on the RD cost. The encoding device may generate an index indicating the specific candidate. The index may be included in the information on the aforementioned inter-prediction. The encoding device may derive the MVL0 and the MVL1 of the specific candidate as the two MVs of the current block.

Alternatively, the encoding device may derive the two MVs by applying FRUC to the current block.

Specifically, for example, the encoding device may determine whether the template matching (TM) mode or the bi-lateral matching (BM) mode is applied to the current block. Further, the encoding device may generate the flag indicating either the TM mode or the BM mode. The information on the inter-prediction may include the flag.

If the BM mode is applied to the current block, the encoding device may derive the motion information candidate list of the current block based on the neighboring block of the current block, and may select the specific candidate from among the candidates included in the motion information candidate list. The encoding device may derive the second motion vector associated with other list than a list among the L0 and the L1, which is associated with the motion vector, by scaling the first motion vector of the specific candidate based on the first temporal distance and the second temporal distance, and may derive the first motion vector and the second motion vector as the MVs of the current block. Herein, the first temporal distance may be a difference value between the picture order count (POC) of the reference picture for the first motion vector and the POC of the current picture including the current block, and the second temporal distance may be a difference value between the POC of the reference picture for the second motion vector and the POC of the current picture. Meanwhile, since the candidate having the smallest cost may be selected as the specific candidate among from the candidates included in the motion information candidate list, the cost for the specific candidate may be derived as the SAD between the reference block which the first motion vector indicates, and the reference block which the second motion vector indicates. That is, the encoding device may derive the costs for the candidates for the motion information candidate list by deriving the second motion vectors of the candidates, and may select the specific candidate by comparing the costs with each other.

Further, if the TM mode is applied to the current block, the encoding device may derive the L0 reference picture and the L1 reference picture of the current block, derive as the VML0 the motion vector indicating the L0 reference block having the smallest cost among the L0 reference blocks of the L0 reference picture, and derive as the MVL1 the motion vector indicating the L1 reference block having the smallest cost among the L1 reference blocks of the L1 reference picture. Herein, the cost of the L0 reference block may be derived as the sum of absolute differences (SAD) between the template of the current block and the template of the L0 reference block, and the cost of the L1 reference block may be derived as the SAD between the template of the current block and the template of the L1 reference block. Further, the template of the current block may represent a specific region including the neighboring samples of the current block, the template of the L0 reference block may represent a specific region including the neighboring samples of the L0 reference block corresponding to the neighboring samples of the current block, and the template of the L1 reference block may represent a specific region including the neighboring samples of the L1 reference block corresponding to the neighboring samples of the current block. Meanwhile, the cost of the L0 reference block or the L1 reference block may be derived based on foregoing Equation 24. Further, the L0 reference picture may be derived as one of L0 reference pictures included in the L0, and the L1 reference picture may be derived as one of L1 reference pictures included in the L1. Further, the L0 reference picture and the L1 reference picture may be derived based on the motion information of the neighboring block of the current block.

Meanwhile, the encoding device may generate a FRUC flag indicating whether FRUC is applied to the current block. The information on the inter-prediction may include the FRUC flag for the current block.

The encoding device determines whether the bi-predictional optical-flow (BIO) prediction deriving the refined motion vector on a sub-block basis is applied to the current block (S1020). For example, the encoding device may determine whether the BIO prediction is applied to the current block, based on the size of the current block. For example, if the size of the current block is less than or equal to 4×4 size, the BIO prediction may not be applied to the current block, and if the size of the current block is greater than 4×4 size, the BIO prediction may be applied to the current block.

Further, as another example, the encoding device may determine whether the BIO prediction is applied to the current block based on whether the TM mode is applied. In one example, if the BM mode is applied to the current block, the BIO prediction may not be applied to the current block, and if the TM mode is applied to the current block, the BIO prediction may be applied to the current block.

If the BIO prediction is applied to the current block, the encoding device derives the refined motion vector for the sub-block of the current block based on the MVL0 and the MVL1 (S1030). In this regard, the size of the sub-block may be preset. For example, the size of the sub-block may be 4×4 size. The refined motion vector may be derived on a sub-block basis of the current block.

x-axis, y-axis and time-axis gradient maps of the reference sample value of the sub-block may be derived based on the MVL0 and the MVL1, and the refined motion vector for the sub-block may be derived based on the gradient map for the sub-block. The refined motion vector for the sub-block may be derived based on foregoing Equation 21 or 23.

The encoding device derives the prediction sample based on the refined motion vector (S1040). The encoding device may derive the prediction sample based on the refined motion vector. The prediction sample for the sub-block of the current block may be derived based on an equation obtained by substituting $V_{x,bk}$ for $V_x$, and $V_{y,bk}$ for $V_y$ in above-described Equation 14. Further, if the first temporal distance and the second temporal distance are different from each other in magnitude, the prediction sample for the sub-block of the current block may be derived based on an equation obtained by substituting $V_{x,bk}$ for $V_x$, and $V_{y,bk}$ for $V_y$ in above-described Equation 15.

Meanwhile, although not shown in FIG. 10, if it is determined that the BIO prediction is not applied, the encoding device may derive the prediction sample for the target sample based on the MVL0 and the MVL1.

The encoding device entropy encodes the information on the inter-prediction of the current block (S1050). The encoding device may entropy encode the information on the inter-prediction, and output the entropy encoded information in the form of a bitstream. The bitstream may be transmitted to the decoding device through a network or a storage medium.

The information on the inter-prediction may include the prediction mode information of the current block. The prediction mode information may represent the inter-prediction mode which is applied to the current block. Further, the information on the inter-prediction may include a flag indicating either the TM mode or the BM mode. Further, the information on the inter-prediction may include the FRUC flag for the current block.

Meanwhile, the encoding device may generate the residual sample based on the generated prediction sample and the original sample of the original picture. The encoding device may generate the information on the residual based on the residual sample. The information on the residual may include transform coefficients relating to the residual sample. The encoding device may derive the reconstruction sample based on the prediction sample and the residual sample. That is, the encoding device may derive the reconstruction sample by adding the prediction sample to the residual sample. Further, the encoding device may encode the information on the residual and output the encoded information in the form of a bitstream. The bitstream may be transmitted to the decoding device through a network or a storage medium.

Figure 11:
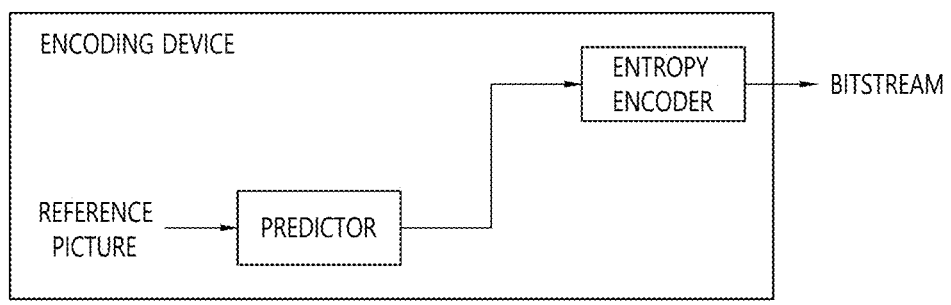
FIG. 11 schematically represents an encoding device performing an image encoding method according to the present disclosure.

FIG. 11 schematically represents an encoding device performing an image encoding method according to the present disclosure. The method disclosed in FIG. 10 may be performed by the encoding device disclosed in FIG. 11. Specifically, for example, the predictor of the encoding device of FIG. 11 may perform S1000 to S1040 in FIG. 10, and the entropy encoder of the encoding device may perform S1050 in FIG. 10.

Figure 12:
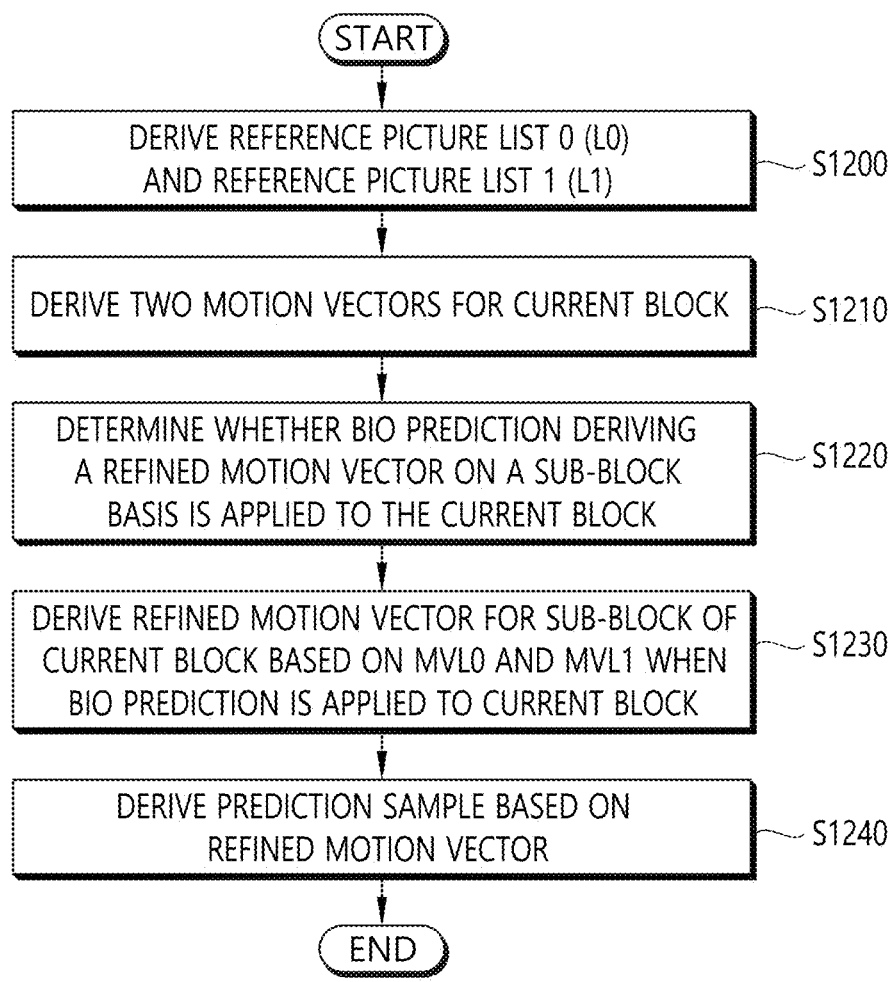
FIG. 12 schematically represents an image decoding method by a decoding device according to the present disclosure.

FIG. 12 schematically represents an image decoding method by a decoding device according to the present disclosure. The method disclosed in FIG. 12 may be performed by the decoding device disclosed in FIG. 2. Specifically, for example, S1200 to S1240 of FIG. 12 may be performed by the predictor of the decoding device.

The decoding device derives the reference picture list 0 (L0) and the reference picture list 1 (L1) (S1200). The decoding device may derive the reference picture list 0 L0 and the reference picture list 1 L1, the reference picture list 0 may be called L0 (List 0), and the reference picture list 1 may be called L1 (List 1).

The decoding device derives two motion vectors (MVs) for the current block, and the two MVs include the MVL0 regarding the L0, and the MVL1 regarding the L1 (S1210). The decoding device may obtain the information on the inter-prediction through the bitstream, and may derive the inter-prediction mode which is applied to the current block based on the information on the inter-prediction.

If the current block is included in the B slice, and the bi-prediction is applied to the current block, the decoding device may derive the two MVs. The two MVs may be the MVL0 for the L0 and the MVL1 for the L1.

The decoding device may derive the two MVs for the current block based on the neighboring block of the current block.

For example, the decoding device may generate the motion information candidate list based on the motion information of the neighboring block, and may select a specific candidate from among the candidates included in the motion information candidate list based on the index indicating the specific candidate. The index may be included in the information on the aforementioned inter-prediction. The decoding device may derive the MVL0 and the MVL1 of the specific candidate as the two MVs of the current block.

Alternatively, the decoding device may derive the two MVs by applying FRUC to the current block.

Specifically, for example, the decoding device may determine whether the template matching (TM) mode or the bi-lateral matching (BM) mode is applied to the current block. As an example, the decoding device may obtain the flag indicating either the TM mode or the BM mode, and may determine that the mode indicated by the flag is applied to the current block. The information on the inter-prediction may include the flag.

If the BM mode is applied to the current block, the decoding device may derive the motion information candidate list of the current block based on the neighboring block of the current block, and may select the specific candidate from among the candidates included in the motion information candidate list. The decoding device may derive the second motion vector associated with other list than a list among the L0 and the L1, which is associated with the motion vector, by scaling the first motion vector of the specific candidate based on the first temporal distance and the second temporal distance, and may derive the first motion vector and the second motion vector as the MVs of the current block. Herein, the first temporal distance may be a difference value between the picture order count (POC) of the reference picture for the first motion vector and the POC of the current picture including the current block, and the second temporal distance may be a difference value between the POC of the reference picture for the second motion vector and the POC of the current picture. Meanwhile, since the candidate having the smallest cost may be selected as the specific candidate among from the candidates included in the motion information candidate list, the cost for the specific candidate may be derived as the SAD between the reference block which the first motion vector indicates, and the reference block which the second motion vector indicates. That is, the decoding device may derive the costs for the candidates for the motion information candidate list by deriving the second motion vectors of the candidates, and may select the specific candidate by comparing the costs with each other.

Further, if the TM mode is applied to the current block, the decoding device may derive the L0 reference picture and the L1 reference picture of the current block, derive as the VML0 the motion vector indicating the L0 reference block having the smallest cost among the L0 reference blocks of the L0 reference picture, and derive as the MVL1 the motion vector indicating the L1 reference block having the smallest cost among the L1 reference blocks of the L1 reference picture. Herein, the cost of the L0 reference block may be derived as the sum of absolute differences (SAD) between the template of the current block and the template of the L0 reference block, and the cost of the L1 reference block may be derived as the SAD between the template of the current block and the template of the L1 reference block. Further, the template of the current block may represent a specific region including the neighboring samples of the current block, the template of the L0 reference block may represent a specific region including the neighboring samples of the L0 reference block corresponding to the neighboring samples of the current block, and the template of the L1 reference block may represent a specific region including the neighboring samples of the L1 reference block corresponding to the neighboring samples of the current block. Meanwhile, the cost of the L0 reference block or the L1 reference block may be derived based on foregoing Equation 24. Further, the L0 reference picture may be derived as one of L0 reference pictures included in the L0, and the L1 reference picture may be derived as one of L1 reference pictures included in the L1. Further, the L0 reference picture and the L1 reference picture may be derived based on the motion information of the neighboring block of the current block.

Meanwhile, the information on the inter-prediction may include the FRUC flag for the current block, and the FRUC flag may represent whether FRUC is applied to the current block.

The decoding device determines whether the bi-predictional optical-flow (BIO) prediction deriving the refined motion vector on a sub-block basis is applied to the current block (S1220). For example, the decoding device may determine whether the BIO prediction is applied to the current block, based on the size of the current block. For example, if the size of the current block is less than or equal to 4×4 size, the BIO prediction may not be applied to the current block, and if the size of the current block is greater than 4×4 size, the BIO prediction may be applied to the current block.

Further, as another example, the decoding device may determine whether the BIO prediction is applied to the current block based on whether the TM mode is applied. In one example, if the BM mode is applied to the current block, the BIO prediction may not be applied to the current block, and if the TM mode is applied to the current block, the BIO prediction may be applied to the current block.

If the BIO prediction is applied to the current block, the decoding device derives the refined motion vector for the sub-block of the current block based on the MVL0 and the MVL1 (S1230). In this regard, the size of the sub-block may be preset. For example, the size of the sub-block may be 4×4 size. The refined motion vector may be derived on a sub-block basis of the current block.

x-axis, y-axis and time-axis gradient maps of the reference sample value of the sub-block may be derived based on the MVL0 and the MVL1, and the refined motion vector for the sub-block may be derived based on the gradient map for the sub-block. The refined motion vector for the sub-block may be derived based on foregoing Equation 21 or 23.

The decoding device derives the prediction sample based on the refined motion vector (S1240). The decoding device may derive the prediction sample based on the refined motion vector. The prediction sample for the sub-block of the current block may be derived based on an equation obtained by substituting $V_{x,bk}$ for $V_x$, and $V_{y,bk}$ for $V_y$ in above-described Equation 14. Further, if the first temporal distance and the second temporal distance are different from each other in magnitude, the prediction sample for the sub-block of the current block may be derived based on an equation obtained by substituting $V_{x,bk}$ for $V_x$, and $V_{y,bk}$ for $V_y$ in above-described Equation 15.

The decoding device may use the prediction sample directly as a reconstruction sample according to prediction mode, or may generate a reconstruction sample by adding a residual sample to the prediction sample.

If there exists a residual sample for the current block, the decoding device may obtain information on residual for the current block from the bitstream. The information on residual may include a transform coefficient relating to the residual sample. The decoding device may derive the residual sample (or residual sample array) for the current block based on the residual information. The decoding device may generate the reconstruction sample based on the prediction sample and the residual sample, and may derive a reconstructed block or reconstructed picture based on the reconstruction sample. After this, as described above, the decoding device may apply an in-loop filtering procedure such as an SAO procedure and/or deblocking filtering to the reconstructed picture in order to improve subjective/objective video quality as needed.

Meanwhile, although not shown in FIG. 12, if it is determined that the BIO prediction is not applied, the decoding device may derive the prediction sample for the target sample based on the MVL0 and the MVL1. The decoding device may use the prediction sample directly as a reconstruction sample according to prediction mode, or may generate a reconstruction sample by adding a residual sample to the prediction sample.

Figure 13:
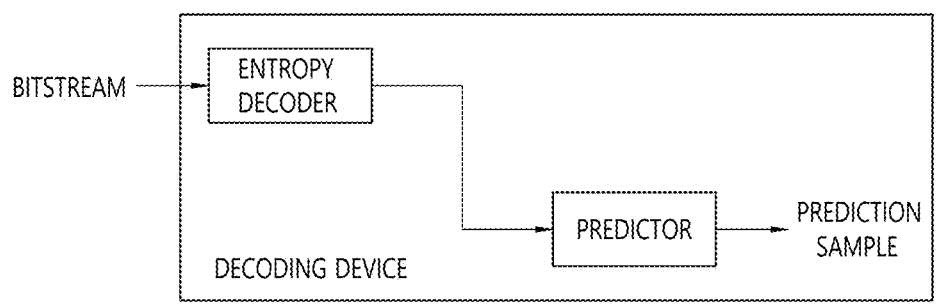
FIG. 13 schematically represents a decoding device performing an image decoding method according to the present disclosure.

FIG. 13 schematically represents a decoding device performing an image decoding method according to the present disclosure. The method disclosed in FIG. 12 may be performed by the decoding device disclosed in FIG. 13. Specifically, for example, the predictor of the decoding device of FIG. 13 may perform S1200 to S1240 of FIG. 12. Meanwhile, the information on the inter-prediction and/or information on the residual may be obtained by an entropy decoder of the decoding device disclosed in FIG. 13.

According to the above-described present disclosure, it is possible to reduce the computational complexity of the inter-prediction which uses the refined motion vector derived on a sub-block basis by determining whether the BIO prediction is applied to the current block, through which it is possible to improve the overall coding efficiency.

Further, according to the present disclosure, it is possible to reduce the computational complexity of the inter-prediction which uses the refined motion vector derived on a sub-block basis by determining based on the mode of FRUC whether the BIO prediction is applied, through which it is possible to improve the overall coding efficiency.

In the above-described embodiments, the methods are explained based on flowcharts by means of a series of steps or blocks, but the present disclosure is not limited to the order of steps, and a certain step may occur in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the disclosure may be implemented as a software form, and an encoding device and/or decoding device according to the disclosure may be included in a device for image processing, such as, a TV, a computer, a smartphone, a set-top box, a display device or the like.

When embodiments in the disclosure are embodied by a software, the above-described methods may be embodied as modules (processes, functions or the like) to perform the above-described functions. The modules may be stored in a memory and may be executed by a processor. The memory may be inside or outside the processor and may be connected to the processor via a well-known various means. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding device and the encoding device to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment based on a user's request through the web server, which functions as an instrument that informs a user of what service there is. When the user requests a service which he or she wants, the web server transfers it to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. A decoding apparatus for image decoding, the decoding apparatus comprising:
a memory; and
at least one processor connected to the memory, the at least one processor configured to:
obtain image information including residual information from a bitstream;
derive a current block based on partitioning of a current picture, wherein the current block is a non-square block;
derive a reference picture list 0 (L0) and a reference picture list 1 (L1);
derive two motion vectors (MVs) for the current block, wherein the two MVs include an MVL0 for the L0, and an MVL1 for the L1;
determine whether bi-directional optical-flow (BIO) prediction is applied to the current block;
generate prediction samples of the current block based on the MVL0, the MVL1 and a result of determining that the BIO prediction is applied to the current block;
generate residual samples based on the residual information; and
generate reconstructed samples based on the prediction samples and the residual samples,
wherein the at least one processor is further configured to:
determine whether the BIO prediction is applied to the current block by comparing a first threshold value with a width of the current block and comparing a second threshold value with a height of the current block,
wherein based on the width of the current block being greater than or equal to the first threshold value and the height of the current block being greater than or equal to the second threshold value, it is determined that the BIO prediction is applied to the current block, and
wherein based on the width of the current block being less than the first threshold value or the height of the current block being less than the second threshold value, it is determined that the BIO prediction is not applied to the current block, and
wherein the first threshold value is 8.

2. An encoding apparatus for image encoding, the encoding apparatus comprising:
a memory; and
at least one processor connected to the memory, the at least one processor configured to:
derive a current block based on partitioning of a current picture, wherein the current block is a non-square block;
derive a reference picture list 0 (L0) and a reference picture list 1 (L1);
derive two motion vectors (MVs) for the current block, wherein the two MVs include an MVL0 for the L0, and an MVL1 for the L1;
determine whether bi-directional optical-flow (BIO) prediction is applied to the current block;
generate prediction samples of the current block based on the MVL0, the MVL1 and a result of determining that the BIO prediction is applied to the current block;
generate residual samples of the current block based on the prediction samples;
generate residual information based on the residual samples;
encode image information including information on inter-prediction of the current block and the residual information,
wherein the at least one processor is further configured to:
determine whether the BIO prediction is applied to the current block by comparing a first threshold value with a width of the current block and comparing a second threshold value with a height of the current block,
wherein based on the width of the current block being greater than or equal to the first threshold value and the height of the current block being greater than or equal to the second threshold value, it is determined that the BIO prediction is applied to the current block,
wherein based on the width of the current block being less than the first threshold value or the height of the current block being less than the second threshold value, it is determined that the BIO prediction is not applied to the current block, and
wherein the first threshold value is 8.

3. An apparatus for transmitting data for an image, the apparatus comprising:
at least one processor configured to obtain a bitstream for the image, wherein the bitstream is generated based on deriving a current block based on partitioning of a current picture, wherein the current block is a non-square block, deriving a reference picture list 0 (L0) and a reference picture list 1 (L1), deriving two motion vectors (MVs) for the current block, wherein the two MVs include an MVL0 for the L0, and an MVL1 for the L1, determining whether bi-directional optical-flow (BIO) prediction is applied to the current block, generating prediction samples of the current block based on the MVL0, the MVL1 and a result of determining that the BIO prediction is applied to the current block, generating residual samples of the current block based on the prediction samples, generating residual information based on the residual samples, and encoding image information including information on inter-prediction of the current block and the residual information; and
a transmitter configured to transmit the data comprising the bitstream,
wherein determining whether the BIO prediction is applied to the current block, comprises:
determining whether the BIO prediction is applied to the current block by comparing a first threshold value with a width of the current block and comparing a second threshold value with a height of the current block,
wherein based on the width of the current block being greater than or equal to the first threshold value and the height of the current block being greater than or equal to the second threshold value, it is determined that the BIO prediction is applied to the current block,
wherein based on the width of the current block being less than the first threshold value or the height of the current block being less than the second threshold value, it is determined that the BIO prediction is not applied to the current block, and
wherein the first threshold value is 8.

* * * * *